United States Patent
Washington et al.

(10) Patent No.: US 11,958,198 B2
(45) Date of Patent: Apr. 16, 2024

(54) PREDICTIVE INSTRUCTION TEXT WITH VIRTUAL LAB REPRESENTATION HIGHLIGHTING

(71) Applicant: Artificial, Inc., Palo Alto, CA (US)

(72) Inventors: Jeff Washington, Round Rock, TX (US); Geoffrey J. Budd, Redwood City, CA (US); Nikhita Singh, Palo Alto, CA (US); Jake Sganga, Los Angeles, CA (US); Alexander Li Honda, Sunnyvale, CA (US)

(73) Assignee: Artificial, Inc., Palo Alto, CA (US)

( * ) Notice: Subject to any disclaimer, the term of this patent is extended or adjusted under 35 U.S.C. 154(b) by 0 days.

(21) Appl. No.: 17/392,119

(22) Filed: Aug. 2, 2021

(65) Prior Publication Data
US 2022/0043561 A1    Feb. 10, 2022

Related U.S. Application Data

(60) Provisional application No. 63/060,974, filed on Aug. 4, 2020.

(51) Int. Cl.
*G01N 35/00* (2006.01)
*B25J 9/16* (2006.01)
(Continued)

(52) U.S. Cl.
CPC .......... *B25J 9/1671* (2013.01); *B25J 9/1605* (2013.01); *B25J 9/163* (2013.01); *B25J 9/1653* (2013.01);
(Continued)

(58) Field of Classification Search
None
See application file for complete search history.

(56) References Cited

U.S. PATENT DOCUMENTS

| 10,648,993 B2 | 5/2020 | Lüdicke et al. |
| 2006/0271287 A1* | 11/2006 | Gold .................... G06F 3/04847 701/426 |

(Continued)

FOREIGN PATENT DOCUMENTS

| CN | 108942934 A | 12/2018 |
| WO | WO 2019/139930 A1 | 7/2019 |

OTHER PUBLICATIONS

PCT International Search Report and Written Opinion, PCT Application No. PCT/US2021/44226, dated Jan. 20, 2022, 14 pages.
(Continued)

*Primary Examiner* — Stella Higgs
(74) *Attorney, Agent, or Firm* — Fenwick & West LLP

(57) ABSTRACT

A lab automation system receives an instruction from a user to perform a protocol within a lab via an interface including a graphical representation of the lab. The lab includes a robot and set of equipment rendered within the graphical representation of the lab. The lab automation system identifies an ambiguous term of the instruction and pieces of equipment corresponding to the ambiguous term and modifies the interface to include a predictive text interface element listing the pieces of equipment. Upon a mouseover of a listed piece of equipment within the predictive text interface element, the lab automation system modifies the graphical representation of the lab to highlight the listed piece of equipment corresponding to the mouseover. Upon a selection of the listed piece of equipment within the predictive text interface element, the lab automation system modifies the instruction to include the listed piece of equipment.

20 Claims, 17 Drawing Sheets

(51) Int. Cl.
*B25J 13/08* (2006.01)
*B25J 19/02* (2006.01)
*G06F 3/04812* (2022.01)
*G06F 3/04815* (2022.01)
*G06F 3/04842* (2022.01)
*G06F 40/10* (2020.01)
*G06F 40/40* (2020.01)
*G06N 20/00* (2019.01)
*G06T 7/50* (2017.01)
*G06T 7/70* (2017.01)
*G06T 7/80* (2017.01)

(52) U.S. Cl.
CPC .......... *B25J 9/1658* (2013.01); *B25J 9/1661* (2013.01); *B25J 9/1679* (2013.01); *B25J 9/1692* (2013.01); *B25J 9/1697* (2013.01); *B25J 13/089* (2013.01); *B25J 19/023* (2013.01); *G01N 35/0099* (2013.01); *G06F 3/04812* (2013.01); *G06F 3/04815* (2013.01); *G06F 3/04842* (2013.01); *G06F 40/10* (2020.01); *G06F 40/40* (2020.01); *G06N 20/00* (2019.01); *G06T 7/50* (2017.01); *G06T 7/70* (2017.01); *G06T 7/80* (2017.01)

(56) References Cited

U.S. PATENT DOCUMENTS

| | | | |
|---|---|---|---|
| 2011/0238211 A1* | 9/2011 | Shirado | B25J 9/1661 901/50 |
| 2012/0072023 A1* | 3/2012 | Ota | B25J 9/1664 901/1 |
| 2013/0063550 A1 | 3/2013 | Ritchey et al. | |
| 2014/0148949 A1 | 5/2014 | Graca et al. | |
| 2014/0258925 A1* | 9/2014 | Peloquin | G06F 3/0481 715/808 |
| 2016/0023351 A1 | 1/2016 | Kuffner et al. | |
| 2016/0107396 A1* | 4/2016 | Berman | B25J 11/00 425/510 |
| 2016/0259699 A1 | 9/2016 | Greenspan et al. | |
| 2017/0176479 A1 | 6/2017 | Ludicke et al. | |
| 2018/0215039 A1* | 8/2018 | Sinyavskiy | A47L 11/4011 |
| 2018/0267496 A1 | 9/2018 | Wang et al. | |
| 2018/0301150 A1* | 10/2018 | Woo | G06F 3/04842 |
| 2019/0005838 A1 | 1/2019 | Yu et al. | |
| 2019/0018694 A1 | 1/2019 | Rhodes et al. | |
| 2019/0105779 A1* | 4/2019 | Einav | B25J 9/1689 |
| 2019/0133689 A1 | 5/2019 | Johnson et al. | |
| 2019/0370273 A1* | 12/2019 | Frison | G06F 16/338 |
| 2019/0375108 A1 | 12/2019 | Boudreau et al. | |
| 2020/0023521 A1 | 1/2020 | Dan | |
| 2020/0030979 A1 | 1/2020 | Bank et al. | |
| 2020/0055192 A1 | 2/2020 | Ju | |
| 2020/0061839 A1 | 2/2020 | Deyle et al. | |
| 2020/0223063 A1 | 7/2020 | Pascanu et al. | |
| 2020/0282575 A1 | 9/2020 | Haeusler et al. | |
| 2021/0053230 A1 | 2/2021 | Mizoguchi et al. | |
| 2021/0060771 A1 | 3/2021 | Gaydarov | |
| 2021/0069901 A1 | 3/2021 | Oda et al. | |
| 2021/0241491 A1 | 8/2021 | Islam et al. | |
| 2021/0291376 A1 | 9/2021 | Wang et al. | |
| 2021/0318687 A1* | 10/2021 | Seifert | B25J 5/00 |
| 2022/0035369 A1 | 2/2022 | Kim et al. | |

OTHER PUBLICATIONS

PCT Invitation to Pay, PCT Application No. PCT/US21/44226, Oct. 13, 2021, three pages.
United States Office Action, U.S. Appl. No. 17/392,113, dated Jun. 16, 2023, 35 pages.
United States Office Action, U.S. Appl. No. 17/392,125, dated Jun. 16, 2023, 42 pages.
United States Office Action, U.S. Appl. No. 17/392,105, dated Jul. 5, 2023, 37 pages.
United States Office Action, U.S. Appl. No. 17/392,125, dated Sep. 29, 2023, 46 pages.

* cited by examiner

PREDICTIVE INSTRUCTION TEXT WITH VIRTUAL LAB REPRESENTATION HIGHLIGHTING

CROSS REFERENCE TO RELATED APPLICATIONS

This application claims the benefit of U.S. Provisional Application No. 63/060,974 filed Aug. 4, 2020, which is incorporated by reference in its entirety.

BACKGROUND

In traditional lab environments, human operators work throughout the lab to perform protocols with equipment and reagents. For example, a human operator may mix reagents together, manually calibrate a robot arm, and operate a pipettor robot to handle liquids. However, in some instances, a lab may include components (e.g., equipment, robots, etc.) that can be automated to perform protocols.

Though automating protocols may streamline the necessary processes, automation in lab environments poses unique challenges. For one, the language used by operators or for robots and equipment in labs is not standardized, so communications about protocols for a lab system to perform may be difficult for the lab system to correctly parse. Secondly, operators in labs may not be versed in how to use a lab system for automation given their specific scientific backgrounds. Further, although some of robots and equipment may be capable of easy integration into the lab system for automation, not all robots or equipment may be configured for automation and may lack the appropriate interfaces for the lab system to communicate with. Lastly, each of a range of robots and equipment connected to the lab system may have its own interface for communicating, and the lab system may need to determine how to communicate with each different interface, which may increase latency.

SUMMARY

The following disclosure describes a lab automation system that performs protocols in a lab. In particular, the lab automation system modifies graphical representations of labs based on instructions and interactions received via a graphic user interface.

A lab automation system operates in a lab environment using components such as equipment, reagents, and robots to perform protocols. The lab automation system renders graphical representations of labs. The lab automation system may receive instructions from a user (sent via a graphic user interface) indicating a protocol to be performed in a lab and identifies ambiguous terms in the instructions. The lab automation system modifies the graphic user interface to include predictive test interface elements based on the ambiguous terms such that the user may interact with the graphic user interface to select equipment associated with the ambiguous terms.

In particular, the lab automation system receives an instruction from a user to perform a protocol within a lab via an interface including a graphical representation of the lab. The lab includes a robot and set of equipment rendered within the graphical representation of the lab. The lab automation system identifies an ambiguous term of the instruction and one or more pieces of equipment corresponding to the ambiguous term and modifies the interface to include a predictive text interface element listing the one or more pieces of equipment corresponding to the ambiguous term. Upon a mouseover of a listed piece of equipment within the predictive text interface element, the lab automation system modifies the graphical representation of the lab to highlight the listed piece of equipment corresponding to the mouseover. Upon a selection of the listed piece of equipment within the predictive text interface element, the lab automation system modifies the instruction to include the listed piece of equipment.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
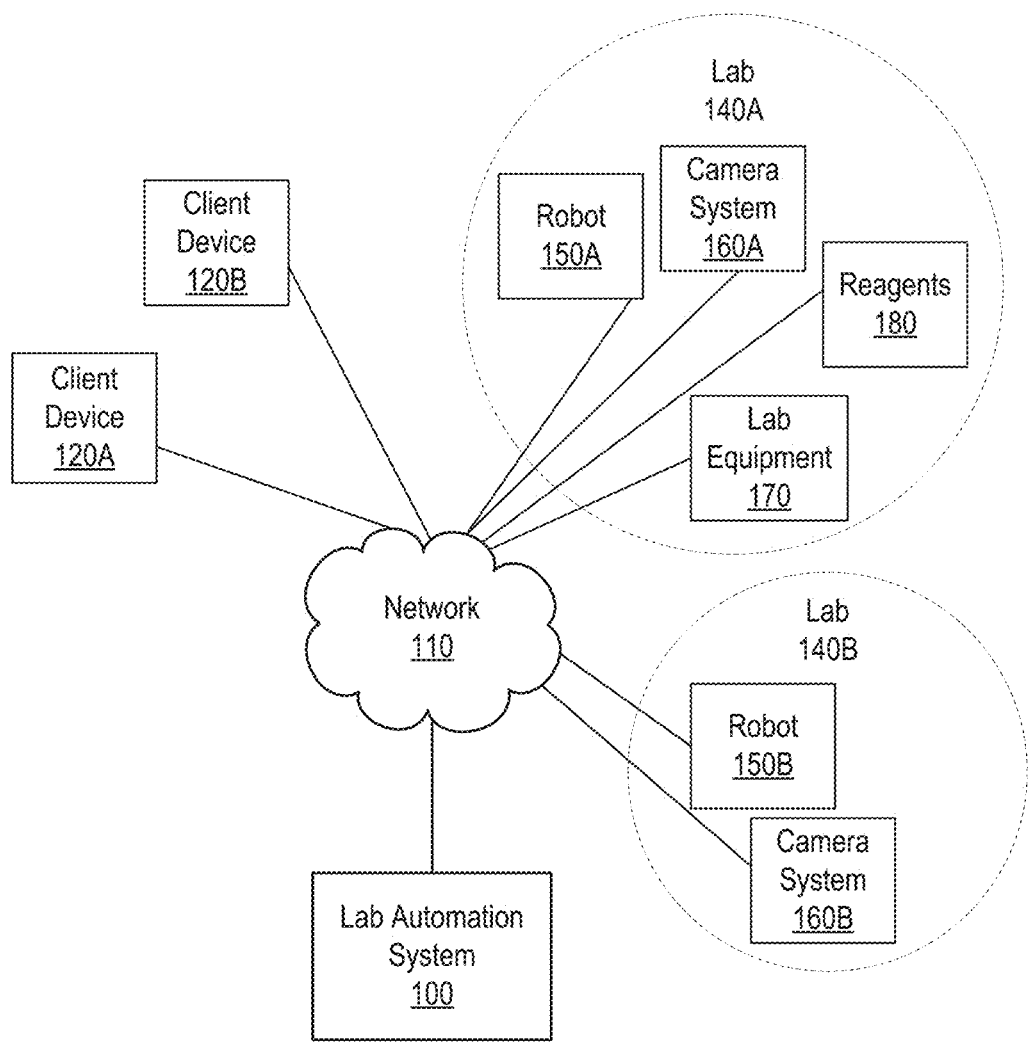
FIG. 1 illustrates a system environment for a lab automation system, according to one embodiment.

FIG. 1 illustrates a system environment for a lab automation system 100, according to one embodiment. The lab automation system 100 is connected to a number of client devices 120 used by operators of one or more labs 140 via a network 110. These various elements are now described in additional detail.

The client devices 120 are computing devices such as smart phones, laptop computers, desktop computers, or any other device that can communicate with the lab automation system 100 via the network 110. The client devices 120 may provide a number of applications, which may require user authentication before a user can use the applications, and the client devices 120 may interact with the lab automation system 100 via an application. The client devices may present graphic user interfaces displaying information transmitted from the lab automation system 100. Though two client devices 120 are shown in FIG. 1, any number of client devices 120 may be connected to the lab automation system 100 in other embodiments. The client devices 120 may be located within labs 140 connected to the lab automation system 100 or external to the labs.

Figure 3:
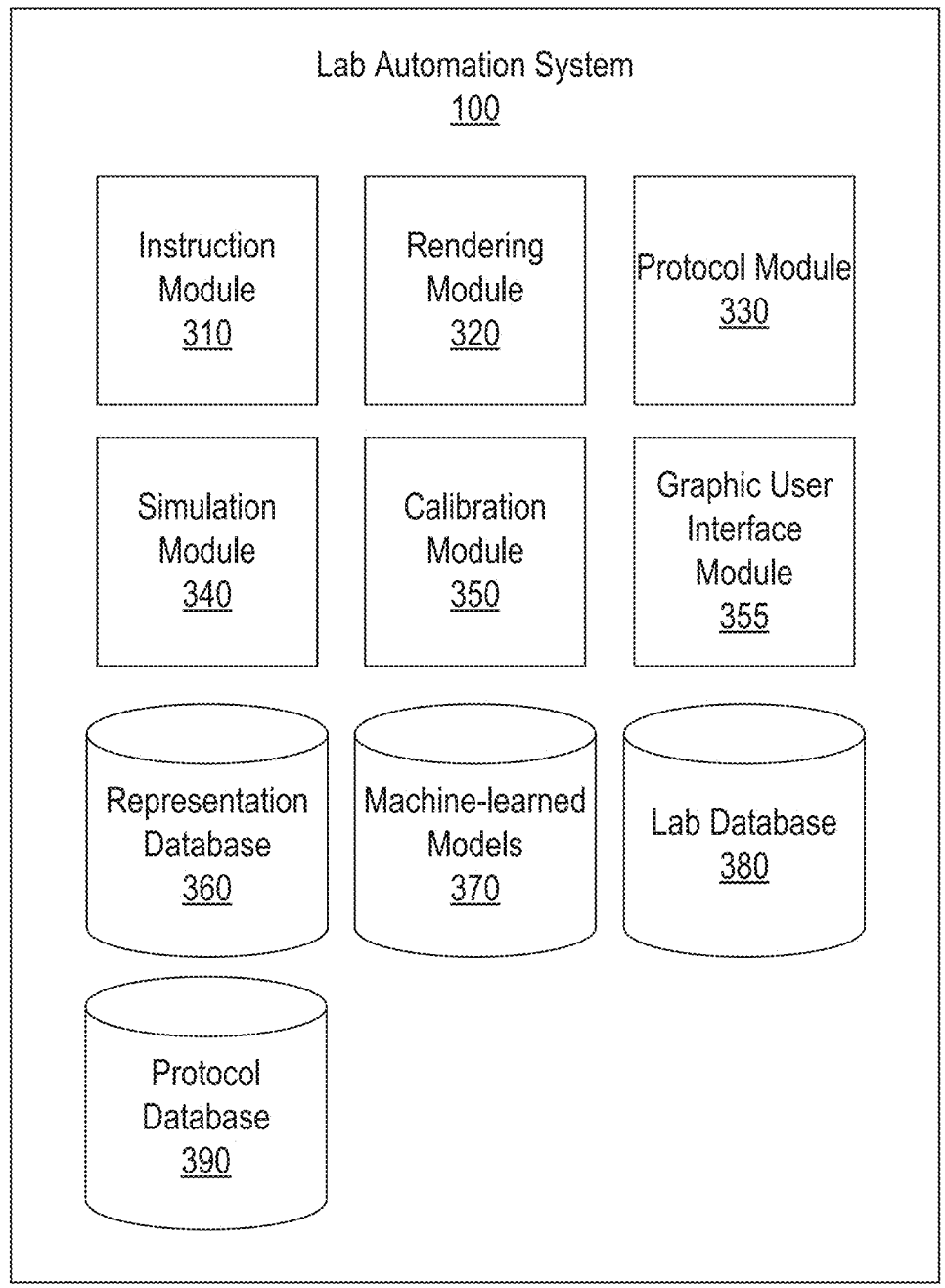
FIG. 3 illustrates a high-level block diagram of the lab automation system, according to one embodiment.

The network 110 connects the client devices 120 to the lab automation system 100, which is further described in relation to FIG. 3. The network 110 may be any suitable communications network for data transmission. In an embodiment such as that illustrated in FIG. 1, the network 110 uses standard communications technologies and/or protocols and can include the Internet. In another embodiment, the network 110 use custom and/or dedicated data communications technologies.

The labs 140 are connected to the lab automation system 100 via the network 110. A lab 140 is a physical space equipped for completing research, experiments, or manufacturing of various products. Each lab 140 includes one or more of robots 150, a camera system 160, lab equipment 170, and reagents 180. The robots 150 may be mobilized to synthesize products or conduct research and experiments in the lab 140. Examples of robots 150 that may be used in the labs 140 are liquid handlers, microplate movers, centrifuges, cappers/decappers, sorters, labelers, loaders, and the like. Each robot 150 may include one or more sensors attached to elements of the robots 150, such as position sensors, inertial measurement units (IMUs), accelerometers, cameras, and the like. Each robot 150 may also include one or more tags attached to external elements of the robot 150. The tags may be visible in image data captured of the lab by the camera system 160, described below, such that the lab automation system may determine positions of the external elements of the robots 150 and calibrate cameras of the camera system 160 based on the tags.

Each lab 140 includes a camera system 160 comprising one or more cameras. The cameras may be video cameras, infra-red cameras, thermographic cameras, heat signature cameras, or any other suitable camera. The cameras of a camera system 160 may be interspersed throughout a lab 140 to capture images and/or video of the lab 140, which may be used by the lab automation system 100 to calibrate the robots 150 and/or lab equipment 170 within the lab.

The lab equipment 170 (or, simply, "equipment") in the lab is used by the robots 150 and/or human operators to manufacture products from materials (e.g., reagents 180) or conduct experiments/research within the lab. Each piece of equipment 170 may be operated by robots 150, human operators, or both. Examples of equipment 170 may include pipettes, beakers, flasks, plates, storage equipment, incubators, plate readers, washers, centrifuges, liquid handlers, sealers, desealers, or any other suitable equipment used in labs 140. The equipment may be used to synthesize products based on one or more reagents 180 stored in the labs 140. Reagents 180 are substances that may be mixed together for chemical reactions. Examples of reagents 180 stored in the labs 140 may include acetic acid, acetone, ammonia, ethanol, formaldehyde, hydrogen peroxide, sodium hydroxide, and the like. The lab automation system 140, which is further described in relation to FIG. 3, maintains a record of the robots 150, equipment 170, and reagents 180 stored at each lab 140 connected to the lab automation system 100.

Figure 2A:
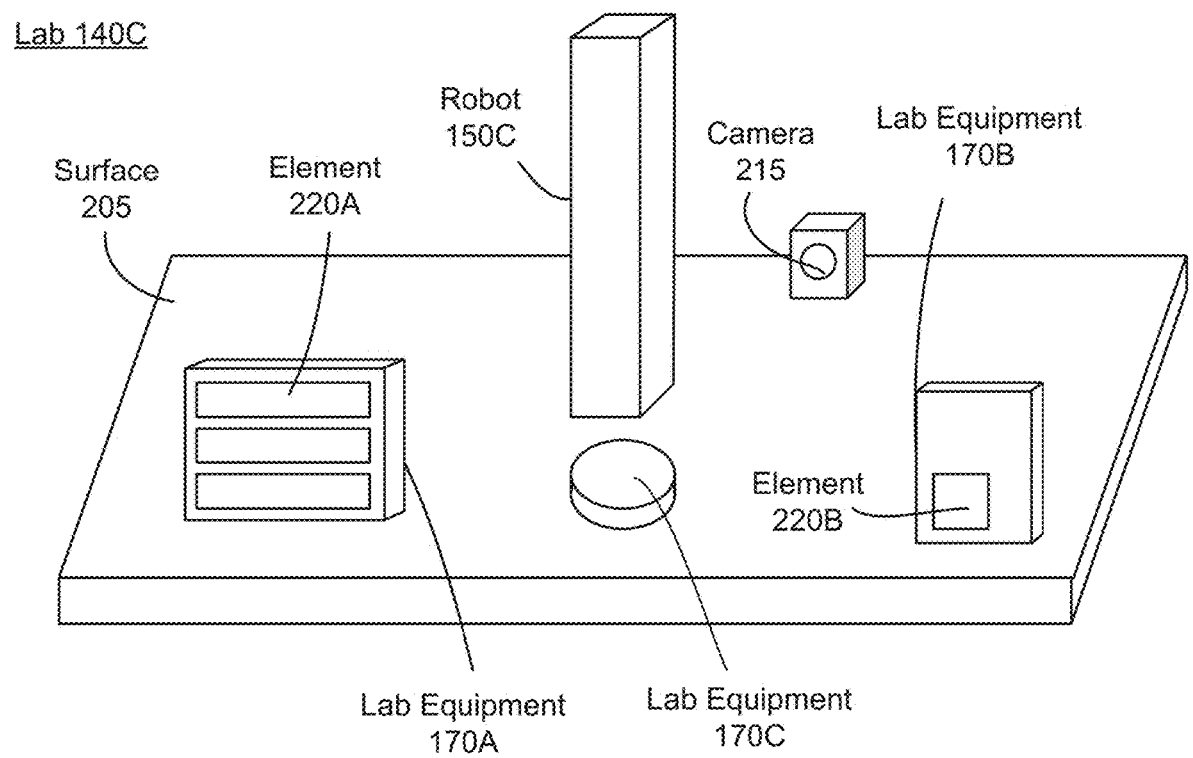
FIG. 2A illustrates components of a lab, according to one embodiment.

FIG. 2A illustrates components of a lab 140C, according to one embodiment. The lab 140C includes a surface 205 and may include one or more components such as robots 150, equipment 170, and reagents 180. In particular, the lab 140C includes a robot 150C programmable to perform operations in the lab 140C (e.g., by interacting with pieces of equipment 170). In the example of FIG. 2A, the lab 140C additionally includes a camera 215 positioned to receive image data describing the lab 140C. In other examples, the camera 215 may be mounted in different locations in the environment 200 or may be incorporated in the robot 150C or attached to an element 220 of a component.

Figure 2B:
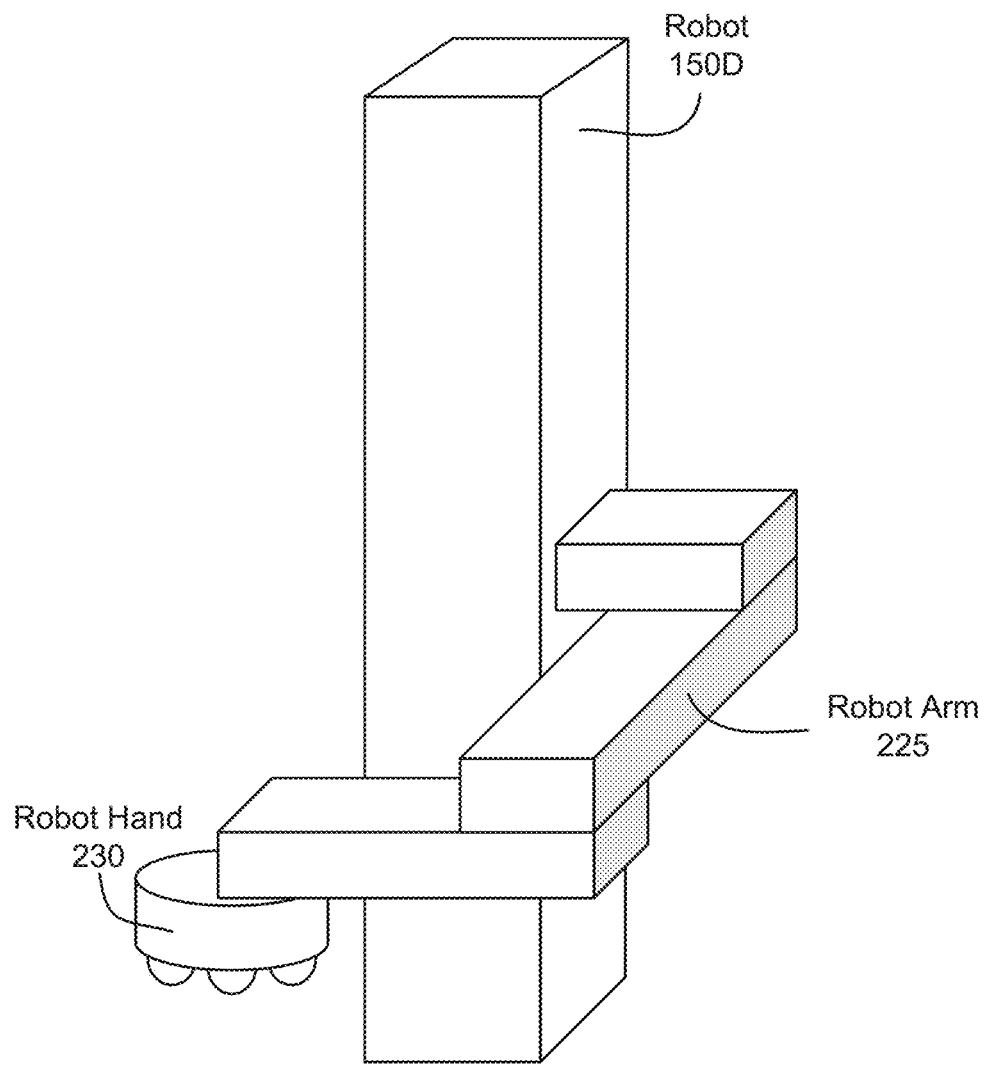
FIG. 2B illustrates an example robot configured to perform protocols in a laboratory environment, according to one embodiment.

FIG. 2B illustrates an example robot 150D configured to perform protocols in a lab 140D according to one embodiment. In the embodiment of FIG. 2B, the robot 150D comprises components including a robot arm 225 and a robot hand 230. A camera of a camera system 160 in the lab 140D enables the lab automation system 100 to receive image data describing the lab 140D, including the robot 150D and any pieces of equipment 170 in the lab 140D. The robot arm 225 comprises one or more jointed, movable pieces with one or more degrees of freedom of motion, and connects a body of the robot 150D to the robot hand 230. The robot hand 230 comprises one or more jointed, movable pieces configured to interact with the components in the lab 140D. For example, the robot hand 230 can include a set of digits, pincers, or claws for moving and lifting pieces of equipment 170 such as pipettes, beakers, and the like, and for interacting with pieces of equipment 170, e.g., inputting or modifying settings, accessing compartments, and the like. In other embodiments, the robot 150D may include additional, fewer, or different elements than those shown in FIG. 2B, and the robot arm 225 and/or the robot hand 230 may include different elements than those shown in FIG. 2B.

Figure 2C:
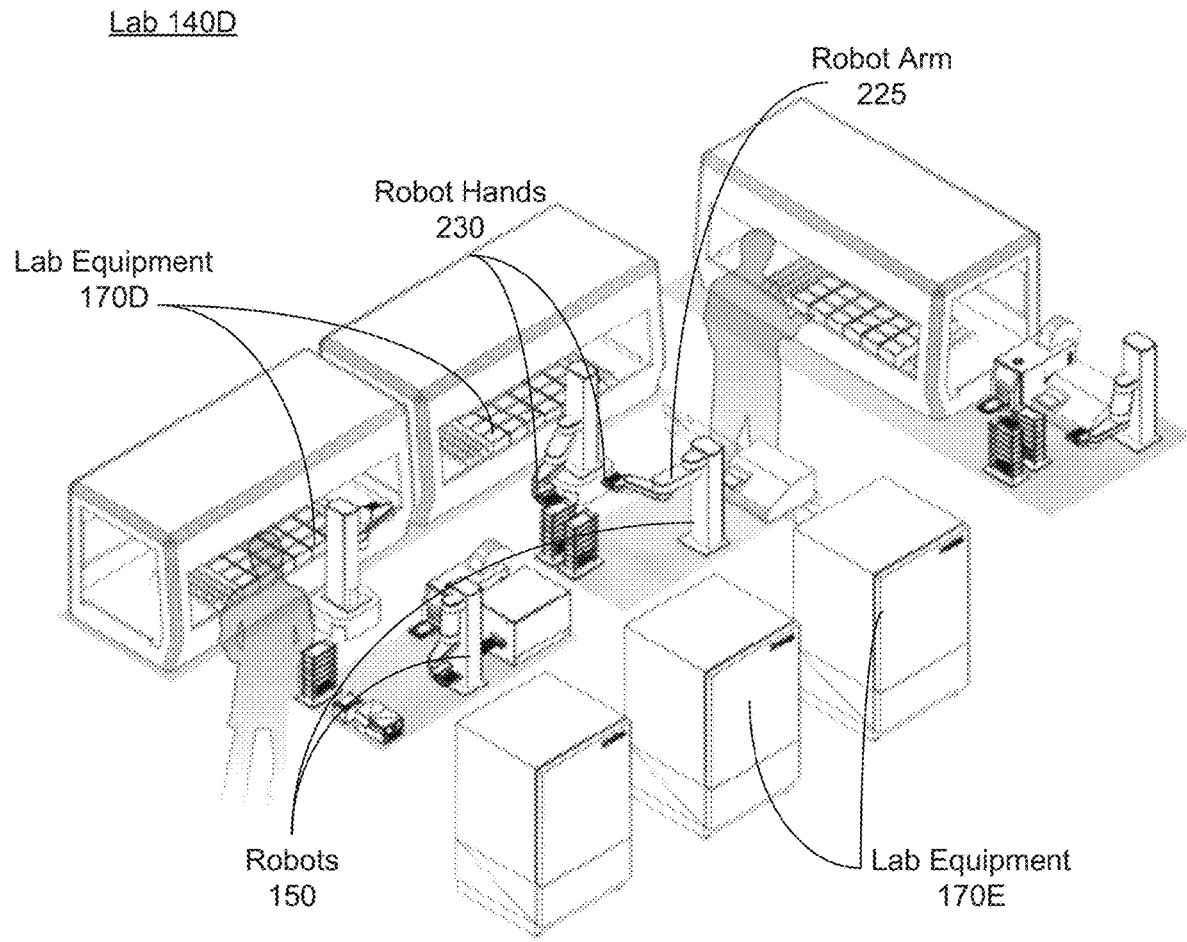
FIG. 2C illustrates a lab, according to one embodiment.

FIG. 2C illustrates a lab 140D, according to one embodiment. The lab 140D includes lab equipment 170 and robots 150 with robot arms 225 and robot hands 230. The robots 150 may interact with the lab equipment 170 to move reagents and other materials for laboratory protocols conducted in the lab 140D. For instance, the robots 150 may access a reagent stored in lab equipment 170E and transfer the reagent to lab equipment 170D using pipettes held by the robot hands 230. Though numerous components are shown in FIG. 2C (e.g., lab equipment such as refrigerators, cabinets, venting systems, etc. and robots such as liquid handlers), other labs 140 connected to the lab automation system 100 may contain other components in other configurations throughout the labs 140.

FIG. 3 illustrates a high-level block diagram of the lab automation system 100, according to one embodiment. The lab automation system 100 includes an instruction module 310, a rendering module 320, a protocol module 330, a simulation module 340, a calibration module 350, a graphic user interface module 355, a representation database 360, one or more machine learned models 370, a lab database 380, and a protocol database 390. In some embodiments, the lab automation system 100 may include additional or alternative modules or databases not shown in FIG. 3.

The instruction module 310 determines steps from a set of instructions. The instruction module 310 receives instructions from the graphic user interface module 355. The instructions indicate how to perform a protocol in a lab 140 and are a set of text input by a user via a graphic user interface displayed via a client device 120. For example, the text of instructions may indicate to "load holders into Hamilton liquid handler, load aluminum polymer, and pipette polymer into holders."

The instruction module 310 converts the text of the instructions into a set of steps. For instance, the instruction module 310 may identify verb phrases within the instructions that indicate operations that need to be done for the protocol. The verb phrases may each include a verb and one or more dependent words that the verb describes, and each verb phrase may correspond to a step. For example, the instruction may identify three verb phrases in the text "load holders into Hamilton liquid handler, load aluminum polymer, and pipette polymer into holders": "load holders," "load aluminum polymer," and "pipette." In some embodiments, the instruction module 310 may apply one or more natural language processing methods and/or machine-learned models 370 to determine the steps of the instructions. The machine learned model 370 may be trained on example texts labeled with one or more steps. The instruction module 310 may store the determined steps in association with the text or a colloquial name of the protocol, which may be received with the text from the graphic user interface module 355, in the protocol database 390.

The instruction module 310 identifies one or more of an operation, lab equipment 170, and reagent 180 for each step of the set of steps. An operation may be described by a verb of the verb phrase associated with the step. The operation may be performed using one or more of lab equipment 170, robots 150, and/or reagents 180 (e.g., components), which may be a complement phrase or adjunct phrase explicit in the verb phrase. For instance, the lab equipment 170 and reagent 180 may be represented by one or more nouns following the verb (e.g., "the holders" and "the aluminum polymer" in the step "load the holders with the aluminum polymer."). In some embodiments, the lab equipment 170 and reagents 180 may be implicit in the step. For instance, the step "load the saline solution" may be associated with the robot "Hamilton liquid handler," which is used to load reagents in labs 140. In some embodiments, the instruction module 310 may identify the operation, lab equipment 170, robot 150, and/or reagent 180 for each step using one or more natural language processing methods (e.g., creating a syntax tree) and/or machine learned model(s) 370 trained on a set of example steps labeled with operations, lab equipment 170, and reagents 180. The instruction module 310 stores the identified operations, lab equipment 170, and reagents 180 with the associated steps in the protocol database 390.

In some embodiments, the instruction module 310 may determine a lab 140 to perform the protocol in based on the text of the instructions. In some instances, the text may be associated with a particular lab 140 indicated by a user of where to perform the protocol associated with the instructions. In other instances, the instruction module 310 may determine a lab 140 for the protocol to be performed in by parsing the text to identify a noun (and one or more descriptive adjectives) representing a lab 140 and compare the parsed text to an index in the lab database 380 that associates labs 140 with colloquial names used by operators, locations of the labs 140, equipment 170, and reagents 180 stored at the labs 140, and the like. For example, the instruction module 310 may determine the text "prep holders in main street lab" is associated with "Lab 1 on Main Street" of the lab database 380. Further, the instruction module 310 may select a lab 140 based on parameters received with the instructions and additional factors such as schedules of the labs 140, operator availability at each lab, equipment available at each lab, reagents available at the lab, and the like. The parameters may describe a desired protocol location for performing the protocol, a desired proximity to the protocol location, equipment preferences, reagent preferences, budget for the protocol, desired amount of automation for the protocol, desired quality level, and the like.

The instruction module 310 may detect one or more ambiguities in the identified operations, equipment 170, and reagents 180 of the steps. An ambiguity may be a word or phrase of the instructions that the instruction module 310 is unable to map to a component (not including prepositions, articles, and conjunctions). To detect ambiguities, the instruction module 310 may remove articles, conjunctions, and prepositions from the instructions and cross-reference each word with the lab database 380 and/or an external dictionary. If the instruction module 310 is still unable to resolve the ambiguity, the instruction module 310 may send an indication to the graphic user interface module 355 to present one or more words associated with the ambiguity to a user and receives one or more selected words from the graphic user interface module 355. The instruction module 310 updates the steps in the protocol database 390 based on the selected words.

The instruction module 310 may also detect one or more errors in the steps. An error may be a combination of one or more components that could not practically function together to perform an operation or using components to perform an operation that would violate a set of safety protocols. The instruction module 310 may detect errors using a combination of natural language processing and information about labs 140 in the lab database 380. For instance, the instruction module 310 may detect the textual segment "move refrigerator with liquid handler" as including an error since the liquid handler is used to move liquids and could not lift the refrigerator. To resolve an error, the instruction module 310 may send a list of components associated with a step to the graphic user interface module 355 for display to a user. The instruction module 310 receives a selection of one or more components from the graphic user interface module 355 and updates the step in the protocol database 390 to use the selected components. In some embodiments, the instruction module 310 may determine one or more variants for the components or operation and update the protocol with the variants.

The instruction module 310 may determine a set of variants for the components of each step. Variants are alternate components that may be used in place of the lab equipment 170, robots 150, and reagents 180 (henceforth "determined components" for simplicity). Each variant may have the same or alternate (e.g., similar) functionality to a corresponding determined component. For instance, variants with the same functionality may perform or be used for the exact same operations as a corresponding determined component. For example, a first robot may be able to lift up 20 pounds of material for an operation, and a second robot that can lift up to 30 pounds of material would be a variant of the first robot. Variants with alternate functionality may perform or be used for substantially similar operations to the determined components. For example, a first reagent may have a specific reaction when mixed with a second reagent. A variant of the first reagent may be a third reagent 180 that has the same specific reaction with the second reagent 180 (in instances where no other reagents are mixed with the described reagents 180). In some embodiments, the instruction module 310 may also determine variants with limited overlapping functionality to the components. In further embodiments, the instruction module 310 may determine the variants based on parameters received with the instructions. The instruction module 310 may account for the parameters (e.g., cost and time to perform the protocol, skillset required of a human operator, etc.) in determining variants.

The instruction module 310 may determine the variants by accessing an index of the lab database 380 to cross-reference components used to perform the same operations. For instance, the instruction module 310 may determine that the lab equipment "liquid holder," "pipette machine," and "handheld dispenser" may all be used to dispense liquid and relate the lab equipment 170 as variants of one another in the lab database 380. In some embodiments, the instruction module 310 may apply a machine learned model 370 to the components to determine the variants. The machine learned model may be trained on components labeled with sets of variants. The instruction module 310 may store the variants with the associated components in the protocol database 390. In some embodiments, the instruction module 310 may determine a set of projections for performing the protocol using each of the one or more variants. Each projection is a list of steps for the protocol using the variant and may include manual (e.g., performed by a human operator) and/or automatic (e.g., performed by a robot 150) steps. The instruction module 310 stores the projections for each variant in the protocol database 390.

The instruction module 310 may also determine variants of the operations of the steps. Variants of the operations are alternate methods of performing the operations. For instance, the operation "separating the reagent into 10 holders" may be mapped to the automatic operation of "dividing" a reagent into equivalent amounts between 10 holders. The instruction module 310 may determine that a human operator manually adding the reagent to each of the ten holders would be a variant of the operation that is a different way of resulting in the same outcome (e.g., the reagent separated into the holders). The instruction module 310 may cross-reference in the lab database to determine variants or may apply a machine learned model 370 to each operation to determine a variant. The machine learned model 370 may be trained on operations labeled by a human operator with a set of variants. The instruction module 310 may store the variants with the associated operations in the protocol database 390. In some embodiments, the instruction module 310 may store the variants with indication of whether a variant is done automatically (e.g., by a robot 150) or manually (e.g., by a human operator).

The instruction module 310 may also determine variants of the labs 140 for performance of the protocol. Alternate labs 140 (e.g., the variants) include enough of the same or similar components and may have enough of the same or similar operations performed in the alternate lab 140 to the selected lab 140 that the protocol can be performed in the alternate lab 140. The instruction module 310 may access the variants of the components and operations from the protocol database 390 and input the components and operations, along with their variants, to a machine learned model 3670 configured to select alternate labs based on components and variants. The machine learned model 370 may be trained on labs 140 labeled with components that are in and operations that may be performed in the lab 140. In other embodiments, the instruction module 310 cross-references the components, operations, and the variants in the lab database 380 to select a lab 140 that includes components and may have operations performed in the lab 140 to complete the protocol. The instruction module 310 stores the variants of the labs in association with the labs in the lab database 380 and/or the protocol database 390.

The instruction module 310 sends the set of steps, each with an identified operation, lab equipment 170, robot 150, and/or reagent 180, to the protocol module 330 along with the lab 140 to perform the protocol in. In some embodiments, the instruction module 310 may send one or more variants to the graphic user interface module 355 for selection by a user, and upon receiving a selection, send the selection to the protocol module 330 for performance in the lab 140. In further embodiments, the instruction module 310 may receive requests for variants for a protocol from the protocol module 330 and communicate with the protocol module 330 to determine the variants for the protocol. The instruction module 310 also sends the set of steps and associated operations, lab equipment 170, robots 150, reagents 180, and lab 140 to the simulation module 340 for simulation in a virtual representation of the lab 140. In some embodiments, the instruction module 310 may send one or more variants to the graphic user interface module 355 for selection by a user, and upon receiving a selection, send the selection to the simulation module 340 for simulation in the virtual representation.

In some embodiments, the instruction module 310 may group one or more protocols for performance in a lab. For instance, the instruction module 310 may receive multiple sets of instructions indicating protocols to perform in a lab 140. The instruction module 310 may determine, based on the components required for each protocol, which protocols can be performed simultaneously or sequentially in a single lab 140 and create a grouped protocol including steps of the determined protocols. The instruction module 310 may send the grouped protocol to the protocol module 330 for performance in the lab 140.

The rendering module 320 renders virtual representations of labs 140. A virtual representation (or graphical representation) of a lab 140 includes one or more virtual elements representing components in the lab 140 in positions corresponding to the actual positions of the components in the actual lab 140. The virtual elements may be labeled based on the corresponding components. In some embodiments, the virtual elements may include a virtual operator representing a human operator who may perform manual operations in a lab 140. Examples of virtual representations are shown in FIGS. 2A and 2C.

The rendering module 320 receives image data from a camera system 160 of a lab 140. The image data may depict a lab 140 and include camera and video data of the lab 140. In some embodiments, the rendering module 320 may also receive, from the graphic user interface module 355, a list of components and corresponding coordinates in the lab 140. The rendering module 320 may also receive sensor data from one or more components in the lab 140.

The rendering module 320 creates virtual elements representing each component based on the image data of the component (e.g., if a liquid handling robot is shown in the image data, the rendering module 320 creates a virtual element depicting the liquid handling machine). In some embodiments, the rendering module 320 saves the virtual elements in the representation database 360 and uses the virtual elements for similar components when rendering other new labs 140. The rendering module 320 renders a virtual representation of the lab 140. In some embodiments, the rendering module 320 dynamically localizes a scene of the lab 140 from the image data using a three-dimensional model that performs spatial abstraction to create the virtual representation. In other embodiments, the rendering module 320 renders the virtual representation by mapping the virtual elements shown in the image data to a virtual area representing the new lab 140. For instance, the rendering module 320 may determine a location of a robot 150 based on the image data (and/or sensor data indicating a position of the robot) and maps a virtual element representing the robot 150 to a corresponding location in the virtual area. The rendering module 320 stores the virtual rendering in the rendering module 320 in association with the lab 140.

The rendering module 320 may also store information received from the graphic user interface module 355 about the components in the lab 140 in the lab database 380 in relation to the lab 140. For instance, the rendering module 320 may receive text for labeling the virtual element from the graphic user interface module 355. The rendering module 320 may determine a user associated with the test and stores the text in association with the virtual element and the user in the representation database 360. The rendering module 320 may additionally store the text in association with the component the virtual element represents in the lab database 380 and/or protocol database 390, such that the user may reference the component using the text when requesting protocols be performed in a lab 140. The rendering module 320 may also embed image data into the virtual representation. For instance, the rendering module 320 may embed image data of components form various angels in the lab 140. In another instance the rendering module 320 may embed image data depicting instructions for performing steps of a protocol or a specific operation in the lab 140.

The protocol module 330 configures robots 150 in a lab 140 to perform protocols. The protocol module 330 receives a set of steps and associated robots 150, operations, lab equipment 170, and reagents 180 from the instruction module 310. For each step, the protocol module 330 configures the associated with the step to perform the operation associated with the step. The protocol module 330 may additionally configure the robot 150 to interact with the lab equipment 170 (if any) and access and use the reagent 180 (if any) associated with the step to perform the operation. In some embodiments, the protocol module 330 may request variants for the protocol from the instruction module 310 and modify the protocol with one or more variants. The protocol module 330 may, in some instances, request for the simulation module 340 to simulate the protocol with one or more variants to determine an experimentation time for the protocol. The experimentation time is the estimated amount of time needed to complete the protocol in the lab 140. The protocol module 330 may select the variants associated with the lowest experimentation time and modify the protocol in the protocol database 390 to use those variants.

The simulation module 340 simulates protocols occurring within labs 140. The simulation module 340 receives request to simulate a protocol in a lab 140. The request may be from the graphic user interface module 355. The simulation module 340 may request a set of steps for the protocol from the instruction module 310 or access a set of steps for the protocol from the protocol module 390. In another embodiment, the request may be in the form of receiving a set of steps to be performed in a lab 140 and associated operations, lab equipment 170, robots 150, and reagents 180 from the instruction module 310.

The simulation module 340 accesses a virtual representation of the lab 140 in the representation database 360. For each step received from the instruction module 310 for the protocol, the simulation module 340 determines which virtual elements of the virtual representation correspond to the components associated with the step. The simulation module 340 determines, based on the operation associated with the step, how the one or more components would need to move within the lab 140 for the operation to be performed and moves the corresponding virtual elements accordingly in the virtual representation of the lab 140. The simulation module 340 may additionally highlight the virtual elements in the virtual representation. The simulation module 340 accesses the lab database 380 to determine whether the movement of components associated with the virtual elements would cause any issues during performance of a protocol. Issues may include robots 150 or lab equipment 170 overlapping, a robot 150 being unable to perform an operation, lack of availability of lab equipment 170 and reagents 180 in the lab 140, and the like, and the lab database stores information describing which components have the ability to stack, overlap, and interact with other components. The simulation module 340 sends the virtual representation with the moved virtual elements and any detected issues to the graphic user interface module 355 for each step.

The simulation module 340 also simulates protocols occurring within a lab 140 in real-time. The simulation module 340 receives requests from the graphic user interface module 355 for simulations of protocols being currently performed in labs 140. For a request, the simulation module 340 accesses a virtual representation of a lab 140 in the representation database 360. The simulation module 340 receives sensor data from robots 150, equipment 170, and a camera system 160 in a lab 140. The sensor data may include image data of the lab 140, position data of components of the robots 150 and/or equipment 170, and any other suitable sensor data. Based on the sensor data, the simulation module 340 determines how the components within the lab 140 have been moved as a protocol is performed and moves corresponding virtual elements in the virtual representation of the lab 140 to mirror the movement of the components. The simulation module 340 may additionally highlight virtual elements corresponding to components being used or moved I the lab 140. The simulation module 340 sends an indication to the graphic user interface module 355 that the virtual representation of the lab 140 is being updated to show the protocol being performed in real-time. Once the protocol is completed, the simulation module 340 stores the virtual representation of the lab 140 showing the current state of the lab 140 (e.g., the current positions of the components in the real world lab 140) in the representation database 360.

The simulation module 340 may also simulate variants of a protocol. The simulation module 340 may receive requests from the graphic user interface module 355 to simulate one or more variants for a protocol. In some embodiments, the request may be associated with a set of parameters. The parameters may describe a desired protocol location for performing the protocol, a desired proximity to the protocol location, equipment preferences, reagent preferences, and the like. The simulation module 340 may select one or more variants to simulate for the protocol to optimize satisfying the parameters (e.g., selecting operations that take less time, cost within the budget, etc.). The simulation module 340 modifies a copy of the virtual representation of the lab 140 to depict the simulation of each variant. In some embodiments, the simulation module 340 may modify the copies in different colors depending on the type of variant. For example, the simulation module 340 may modify the copies to show variants that occur automatically in a first color and variants that occur manually in a second color. The simulation module 340 may store the modified copies in the representation database 360 in association with the variants.

In some embodiments, the simulation module 340 may receive a list of projections for a variant and simulate the projections in the lab 140. A projection is a list of steps and associated operations and components necessary to perform the entire protocol. The simulation module 340 may determine, for each projection, potential errors that may occur if the protocol were performed according to the projection, such as running out of lab equipment 170 or reagents 180, robots 150 blocking one another in the lab 140, scheduling conflicts, and the like. The simulation module 340 modifies a copy of the virtual representation based on simulation of the projections and sends the modified virtual representation to the graphic user interface module 355 for display after completion of the simulation of each step.

The calibration module 350 calibrates cameras of the camera systems 160 connected to the lab automation system 100. The calibration module 350 receives requests to calibrate one or more cameras from the graphic user interface module 355. In some embodiments, the calibration module 350 may periodically calibrate the cameras connected to the lab automation system 100 without receiving an explicit request from the graphic user interface module 355. The calibration module 350 requests image data from the one or more cameras and associates subsets of the image data with its respective camera that captured the image data. The calibration module 350 stores the image data in the lab database 380 in association with the lab 140 and the camera.

For each camera of the one or more cameras, the calibration module 350 determines which lab 140 the camera is located in and requests sensor data from sensors connected to one or more components in the lab 140. The calibration module 350 stores the sensor data in the lab database 380 along with identifiers of the components and the lab 140. The calibration module 350 determines a position of one or more elements 220 of each component based on the sensor data. For instance, the sensor data may indicate position coordinates of a robot arm 225 and robot hand 230 of a robot 150 in the lab 140. In another instance, the position data may indicate the position of an element 220 of a robot 150 relative to a stationary base of the robot 150, the coordinates for which the calibration module 350 may access in the lab database 380.

The calibration module 350 locates tags physically attached to the components in the image data. Each tag may include information encoded on the tag indicating which element 220 of a component the tag is on and may vary in shape, size and color. The calibration module 350 may store information describing where the tags are located and shape, size, and color of the tags in the lab database 380. The calibration module 350 may apply a machine-learned model 370 to the image data to locate tags within the image data. The machine-learned model 370 may be trained on image data with pixels labeled as including a tag or not and coordinates of the tag and may be a classifier, regression model, decision tree, or any suitable model. The calibration module 350 may further determine depth information about the image data based on the tags shown in the images and each tag's associated shape, size, and color.

The calibration module 350 determines the location of the camera based on the determined positions of the components and locations of tags, such as by triangulating. In some embodiments, the calibration module 350 may also account for distortion of the lens of the camera. The distortion may have been previously entered for the camera by an external operator or the calibration module 350 may determine the distortion based on the locations of the tags and/or positions of the components. The calibration module 350 calibrates each camera based on the camera's determined location such that the calibration module 350 may determine locations of other components shown in image data captured by the camera given the camera's determined location.

The calibration module 350 may determine the location of components in a lab 140 using image data from calibrated cameras. The calibration module 350 may receive a request for the location of a particular component in a lab 140 or may periodically determine locations of components in each lab 140. The calibration module 350 accesses image data captured by one or more calibrated cameras in the lab 140 and locates one or more tags that are visible on the particular component. The calibration module 350 determines the location of the particular component based on the location of the one or more tags.

In some embodiments, the calibration module 350 may determine that a camera needs recalibration based on new image data captured by the camera. The calibration module 350 receives new image data from the camera in real-time and determines one or more components shown in the new image data. The calibration module 350 may also request new sensor data from the one or more components (if available, such as when one or more of the components is a robot 150 with an internal camera) in the new image data. The calibration module 350 retrieves historical image data and corresponding historical sensor data from the lab database 380 captured by the camera and determines which components have not moved in the lab 140 based on the historical sensor data and the new sensor data. The calibration module 350 compares the location of the components that have not moved between the historical image data and the new image data. In some embodiments, the calibration module 350 may do so using a machine-learned model 370 trained on sets of image data labeled with discrepancies (e.g., a component appearing in unexpected pixels in the image data). If the calibration module 350 determines that a component does not appear where expected, the calibration module 350 recalibrates the camera. Alternatively, the calibration module 350 may determine which pixels of the image data should show the component in an expected location based on the new sensor data and analyze the new image data to determine if the component is in the expected location. The calibration module 350 recalibrates the camera if the component is not shown in the determined pixels.

The graphic user interface module 355 generates graphic user interfaces for display on one or more client devices 120 connected to the lab automation system 100. Examples of graphic user interfaces are described with respect to in FIGS. 4-7. The graphic user interface module 355 receives, from a client device 120, a request to view a virtual representation of a lab 140. The graphic user interface module 355 retrieves the virtual representation from the representation database 360 or requests a virtual representation from the rendering module 320. The graphic user interface module 355 renders the virtual representation in the graphic user interface. The virtual elements of the virtual representation may be interactive elements that a user may interact with. For instance, upon receiving a mouseover of a virtual element via the graphic user interface, the graphic user interface module 355 may cause the virtual element to become highlighted within the virtual representation or mimic an operation being performed. Further, upon selection of a virtual element, the graphic user interface module 355 may present a tag element connected to the virtual element. A user may enter text to the tag element to label the virtual element and its associated component with. The graphic user interface module 355 sends the text to the rending module 320 for addition to the virtual representation in the representation database 360.

The graphic user interface module 355 renders one or more interactive elements in the graphic user interface. The interactive elements may allow a user to move virtual elements associated with components in a lab, enter coordinates of components in a lab, request a simulation of a protocol, request calibration of one or more cameras, request variants for a protocol, and the like. The interactive elements may also allow a user to select a mode for the graphic user interface to operate in. For example, a first mode may cause the graphic user interface to display simulations of protocols in a virtual presentation and a second mode may cause the graphic user interface to mimic, in real-time, protocol that is currently being performed in a lab.

The graphic user interface module 355 may display one or more simulations of protocols in a lab via the graphic user interface. The graphic user interface module 355 receives, via an interaction with an interactive element of the graphic user interface, a request to simulate a protocol in a lab 140. The graphic user interface module 355 requests a simulation of the protocol in the lab from the simulation module 340. The graphic user interface module 355 receives a virtual representation of the lab with virtual elements moved for each step of a protocol and presents the virtual representation via the graphic user interface. In some embodiments, the graphic user interface may include an interactive scrolling element that allows a user to increment through each step in the virtual representation. The graphic user interface module 355 may receive detected issues for each step from the simulation module 340 and presents the detected issues as alerts via the graphic user interface. The detected issues to the graphic user interface module 355 for each step.

In some embodiments, the request for the simulation may include one or more parameters. Examples of parameters include a desired experimentation time for the protocol, a budget, a necessary skillset for human operators, necessary equipment 170 and/or reagents 180, and the like. The graphic user interface module 355 sends the request with the parameters to the simulation module 340, which determines one or more variants to simulate to satisfy the parameters. Upon displaying the simulation in a virtual representation, the graphic user interface module 355 may display statistics representing whether the parameters are satisfied or not using the one or more variants.

The graphic user interface module 355 may also receive, via an interaction with an interactive element of the graphic user interface, a request to simulate a protocol that is currently occurring in a lab 140. The graphic user interface module 355 requests a simulation of the protocol the simulation module 340. The graphic user interface module 355 receives indications from the simulation module 340 as the simulation module 340 updates the virtual representation of the lab 140 in the representation database 360. The graphic user interface module 355 displays the updated virtual representation in real-time via the graphic user interface. In some embodiments, the graphic user interface module may also send notifications in response to receiving a request. For instance, if the graphic user interface module 3555 receives a request for variants of a robot 150 in a lab 140 but the instruction module 310 indicates that none exist, the graphic user interface module 355 displays a notification on the graphic user interface indicating that no variants are available for the robot 150.

The graphic user interface module 355 may receive instructions via a text box of the graphic user interface. The instructions may be associated with a lab 140 and, in some embodiments, a set of parameters. The graphic user interface module 355 sends the instructions with the lab 140 and parameters to the instruction module 310. The graphic user interface module 355 may receive an indication of an ambiguity or error in the instructions from the instruction module 310. The graphic user interface module 355 may present one or more words associated with an ambiguity via the graphic user interface and receive a selection of one or more words via the graphic user interface, which the graphic user interface module 355 sends to the instruction module 310. The graphic user interface module 355 may also present one or more components associated with an error via the graphic user interface and receive a selection of one or more components via the graphic user interface, which the graphic user interface module 355 sends to the instruction module 310.

The graphic user interface module 355 may receive one or more variants from the instruction module 310 and displays the one or more variants in a selectable list via the user interface. For example, the variants may be a list of alternate labs 140 for the lab 140 for a user to select from. The graphic user interface may highlight, in the virtual representation, virtual elements of components associated with a variant upon receiving mouseover of the variant in the selectable list. In another embodiment, the graphic user interface module 355 may highlight virtual elements representing the variants in the virtual representation such that a user may interact with a highlighted virtual element to select a variant. The graphic user interface module 355 sends selected variants to the instruction module 310.

Graphic User Interface Examples

Figure 4:
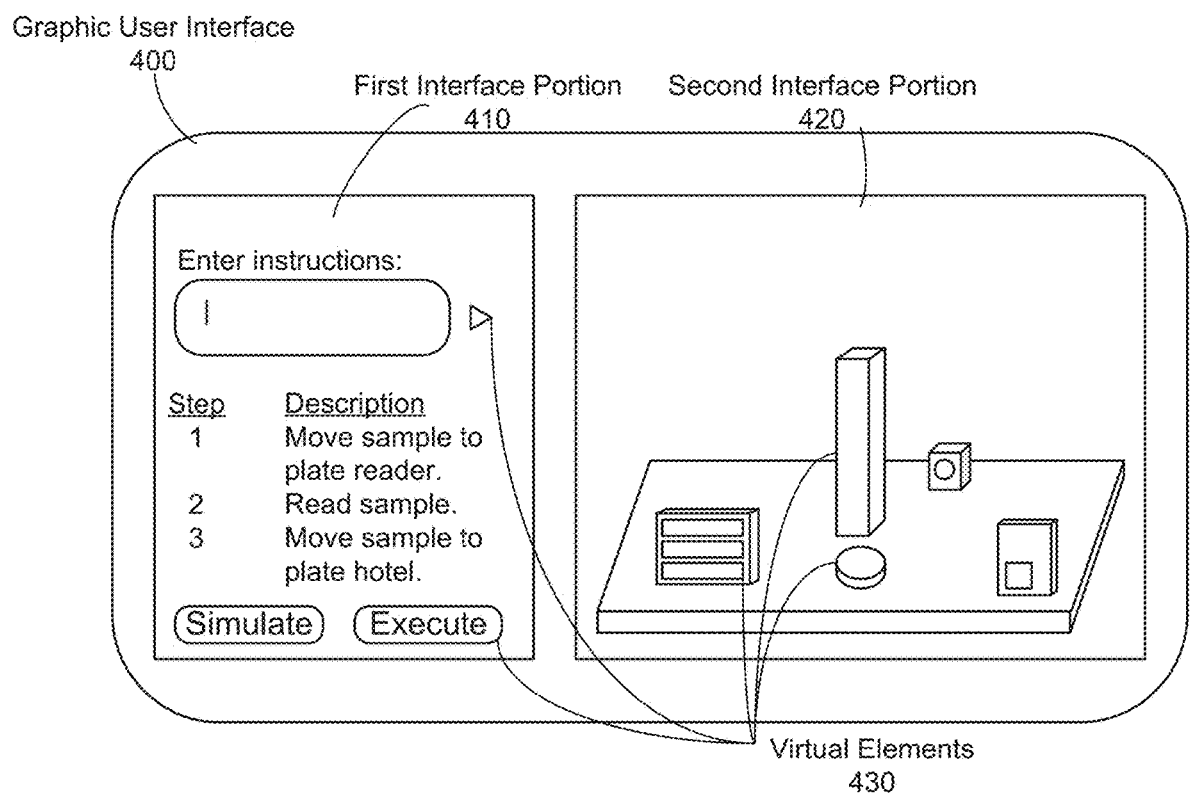
FIG. 4 illustrates a graphic user interface for the lab automation system, according to one embodiment.

FIG. 4 illustrates a graphic user interface for the lab automation system 100, according to one embodiment. In other examples, the graphic user interface 400 may include additional, fewer, or different elements than those shown in FIG. 4. The graphic user interface 400 may be generated by the graphic user interface module 355 described previously. In the example of FIG. 4, the graphic user interface 400 comprises a first interface portion 410 and a second interface portion 420. The first interface portion 410 enables a user of the lab automation system 100 to provide instructions in natural language to the lab automation system 100, which identifies operations, equipment, and/or reagents corresponding to the provided instructions, as described in reference to the instruction module 310. In some embodiments, the first interface portion 410 additionally enables a user to simulate or execute a protocol responsive to steps being generated for provided instructions.

The second interface portion 420 comprises a view of a lab 140. In some embodiments, the second interface portion 420 is a virtual representation of the lab 140 generated by the rendering module 320. Users of the graphic user interface 400 may modify the virtual representation by interacting with virtual elements 430 via the graphic user interface 400 and may request simulations of robots 150 performing the steps of a protocol for visualization or display within the virtual representation. In other embodiments, the second interface portion 420 is a live feed, representation, or view of the lab 140 captured via a camera system 160. In these embodiments, the second interface portion 420 displays the lab 140 in real-time or in near real-time as robots 150 perform protocols.

Figure 5A:
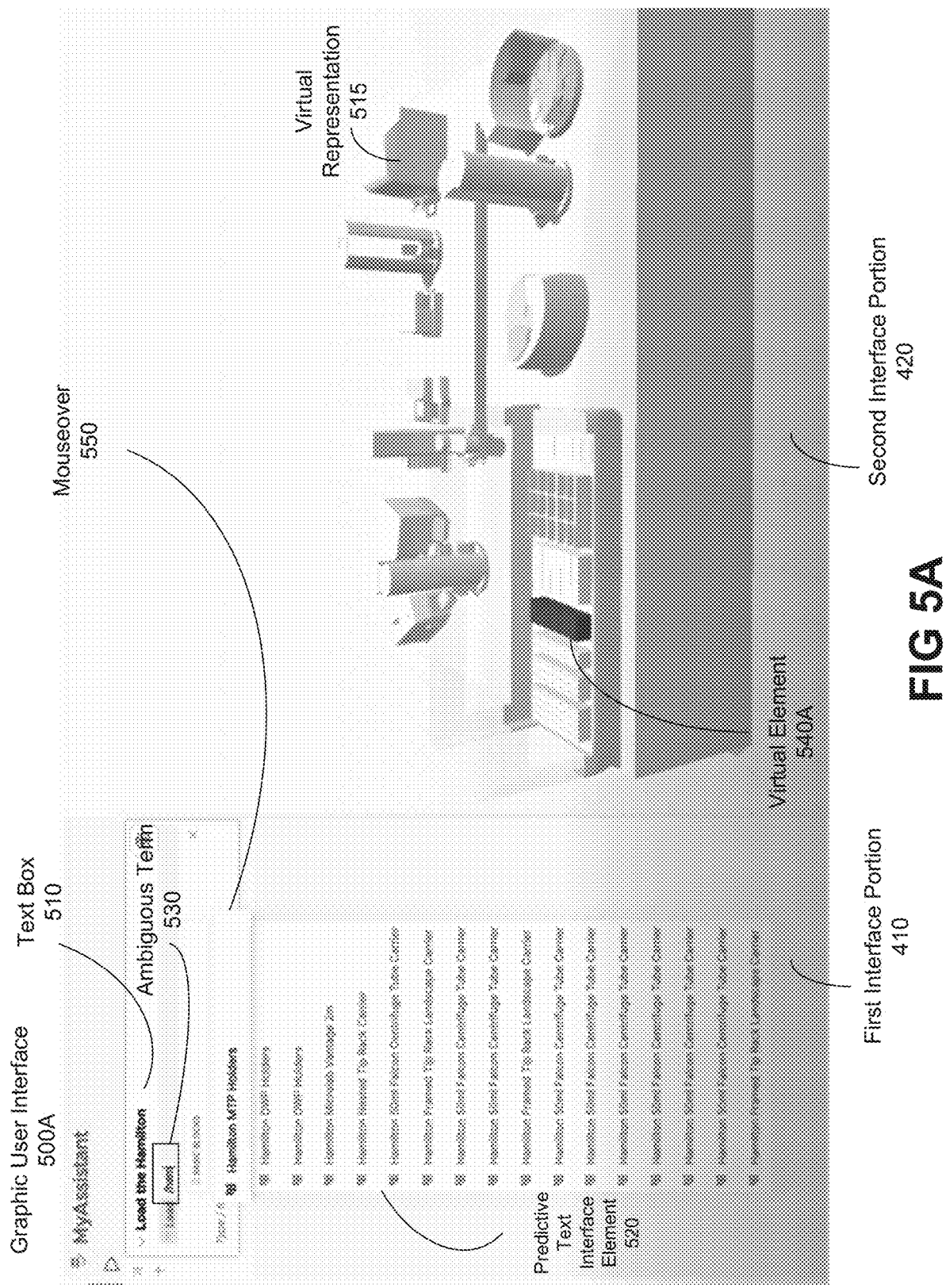
FIG. 5A illustrates an example graphic user interface for inputting instructions, according to one embodiment.

FIG. 5A illustrates an example graphic user interface 500A for inputting instructions, according to one embodiment. In particular, the first interface portion 410 of the graphic user interface 500A includes a text box 510 and a predictive text interface element 520, and the second portion 420 includes a virtual representation 515 of a lab 140. A user may enter instructions to the text box 510, which are sent by the graphic user interface module 355 to the instruction module 310. The graphic user interface module 355 receives one or more pieces of equipment 170 (or other components) determined by the instruction module 310 to correspond to the ambiguous term 530. The one or more pieces of equipment are listed in the predictive text interface element 520 such that upon mouseover 550 of a virtual element 540 representing a piece of equipment 170 in the predictive text interface element 530, the graphic user interface module 355 highlights the virtual element 540A in the virtual representation 515.

Figure 5B:
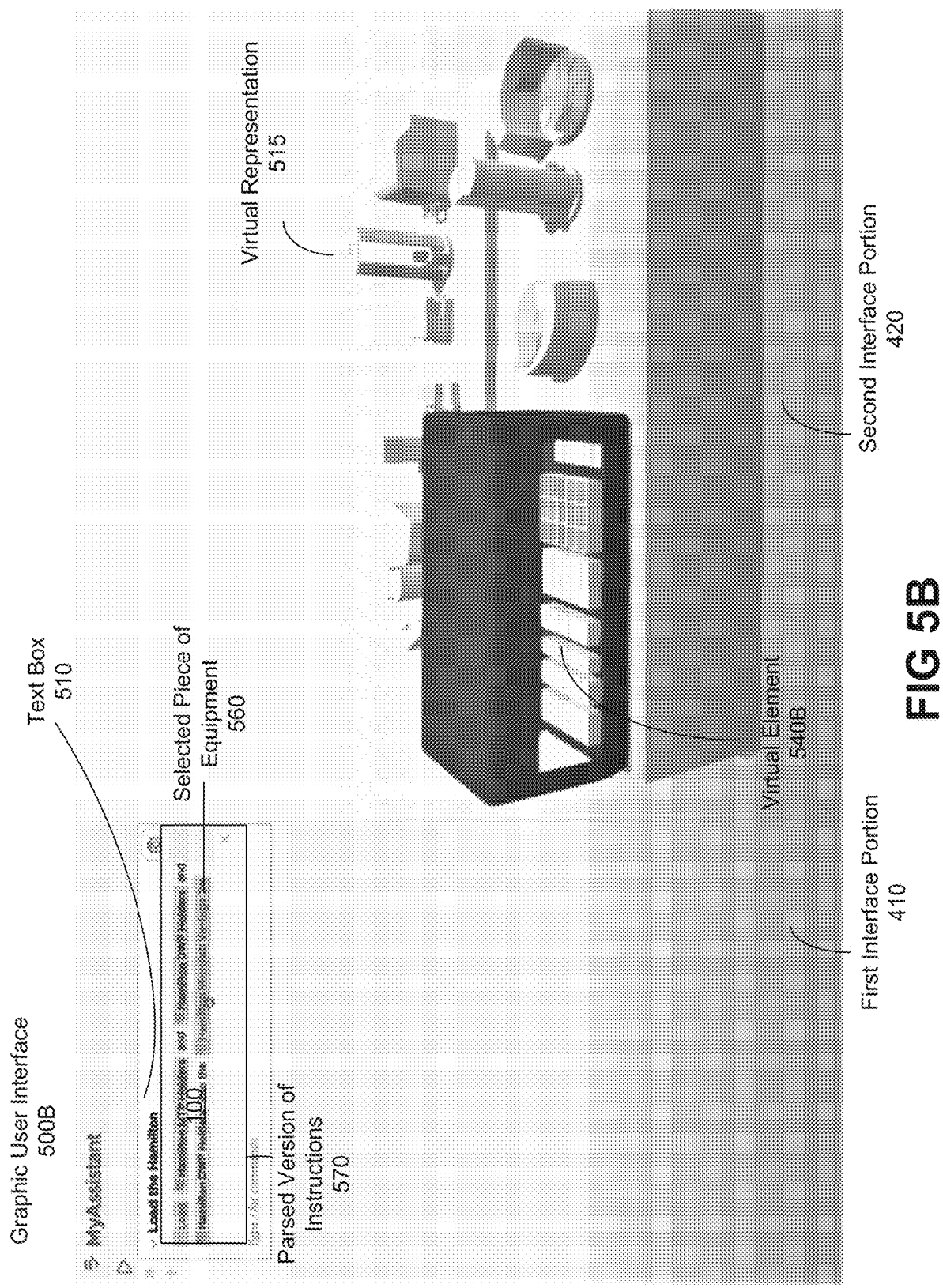
FIG. 5B illustrates an example graphic user interface highlighting equipment in a virtual representation of a lab, according to one embodiment.

Upon selection of one of the pieces of equipment 170 listed in the predictive text interface element 520, the graphic user interface module 355 modifies a parsed version of the instructions 570 to include the selected piece of equipment 170, as shown in FIG. 5B. The graphic user interface module 355 displays the parsed version of the instructions 570 on the graphic user interface 500B. Upon mouseover of the selected piece of equipment 560, the graphic user interface module 355 may highlight 540B or add a virtual element 540B representing the selected piece of equipment 560 in the virtual representation 515.

Figure 6A:
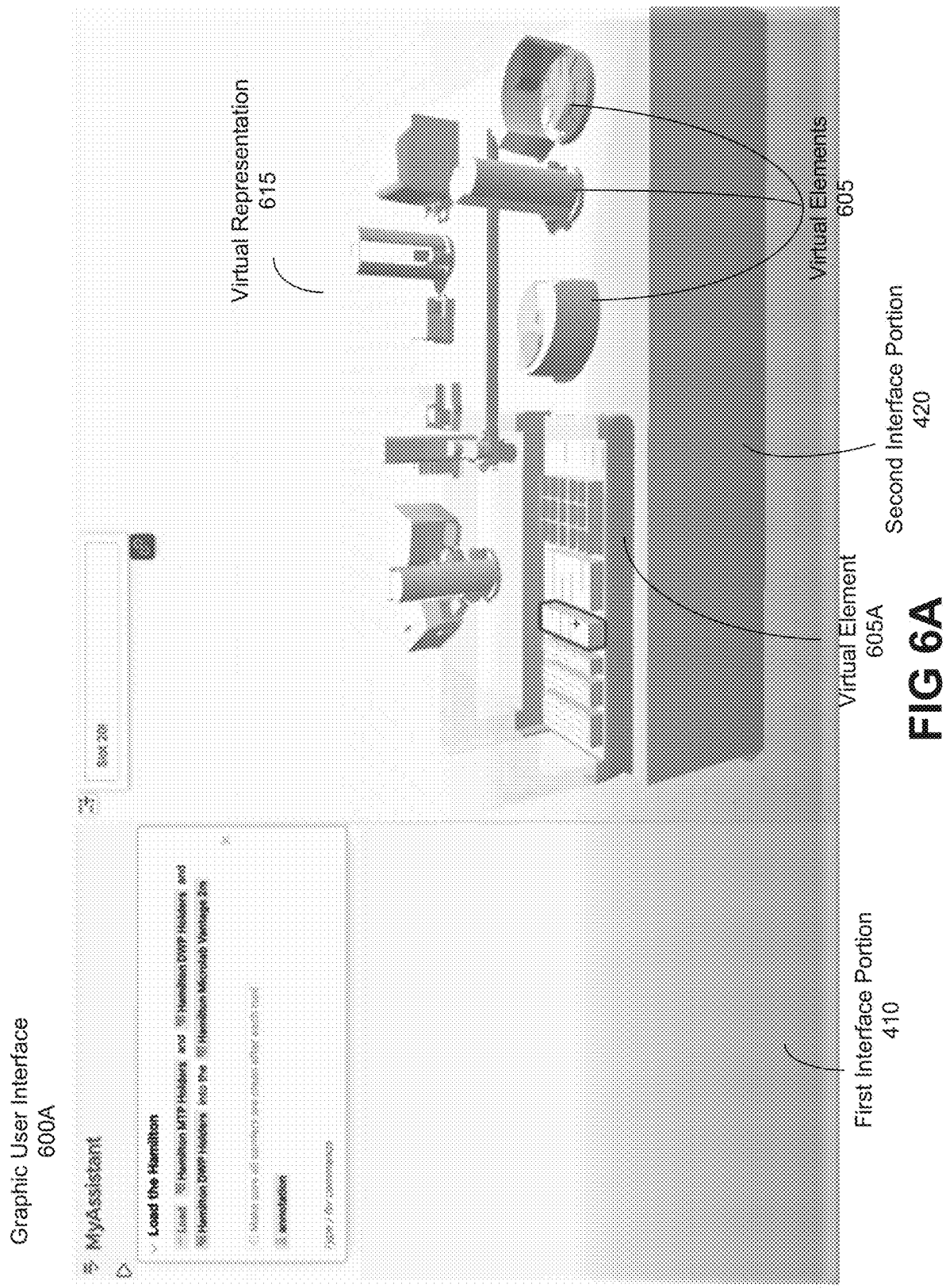
FIG. 6A illustrates an example graphic user interface depicting a selection of a virtual element within a virtual representation of a lab, according to one embodiment.
Figure 6B:
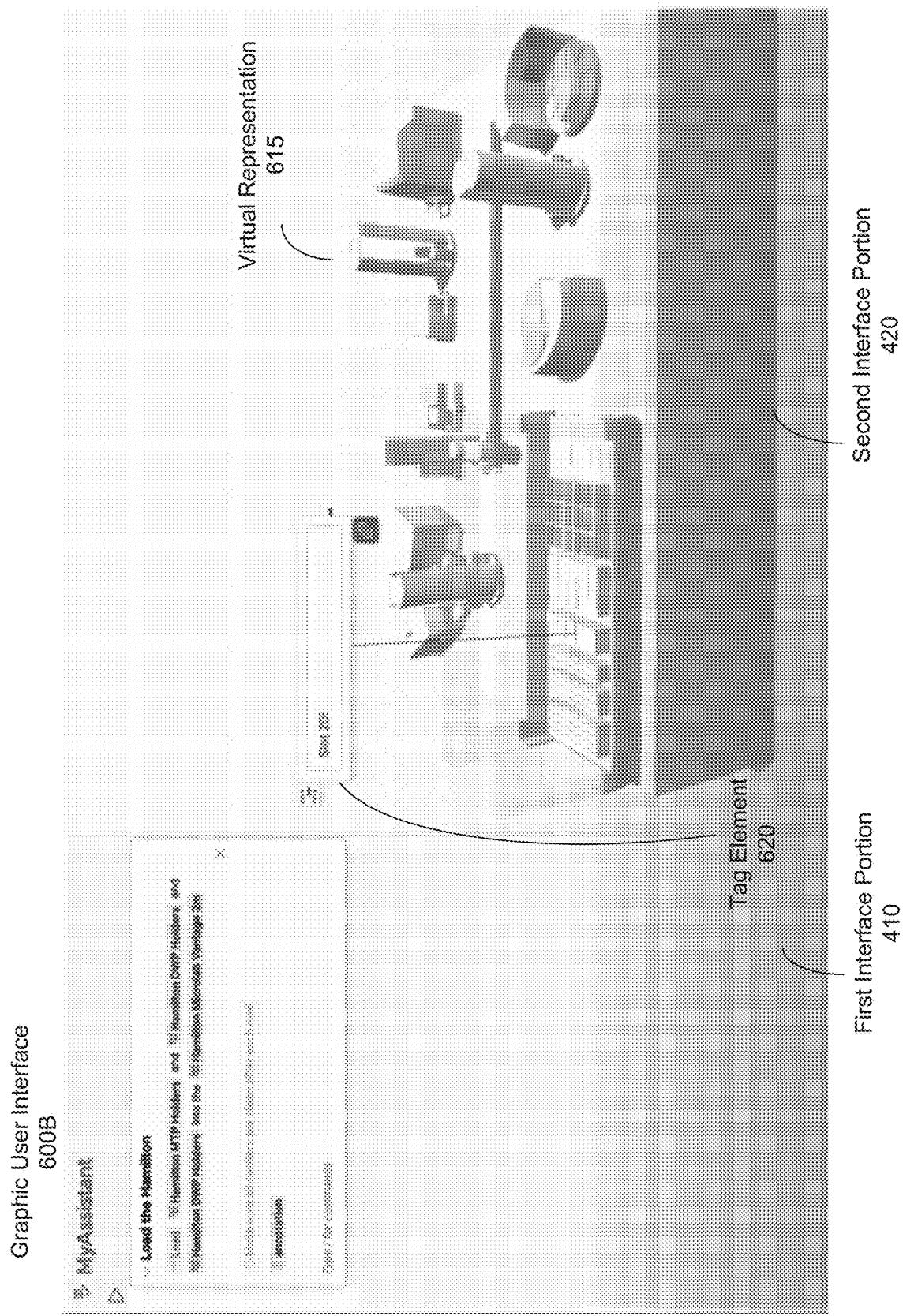
FIG. 6B illustrates an example graphic user interface with a tag element, according to one embodiment.

FIG. 6A illustrates an example graphic user interface 600A depicting a selection of a virtual element 605A within a virtual representation 615 of a lab 140, according to one embodiment. In particular, a user may mouseover virtual elements 605 representing pieces of equipment 170 shown in the virtual representation 615 of the graphic user interface 600A and select 610 a virtual element of a piece of equipment 170 to label. As shown in FIG. 6B, upon selection of a piece of equipment, the graphic user interface module 355 connects the virtual element 605A representing the selected piece of equipment 170 with a tag element 620 in the graphic user interface 600A. A user may enter text for labeling the virtual element 605A via the tag element 620. The graphic user interface module 355 sends the text entered to the tag element 620 to the rendering module 320, which updates the virtual representation 615 of the lab 140 to include the virtual element labeled with the text. For example, if a user labels the virtual element as "chemical box," the instruction module 310 may recognize instructions including a "chemical box" as corresponding to the piece of equipment represented by the virtual element 605A.

Figure 7:
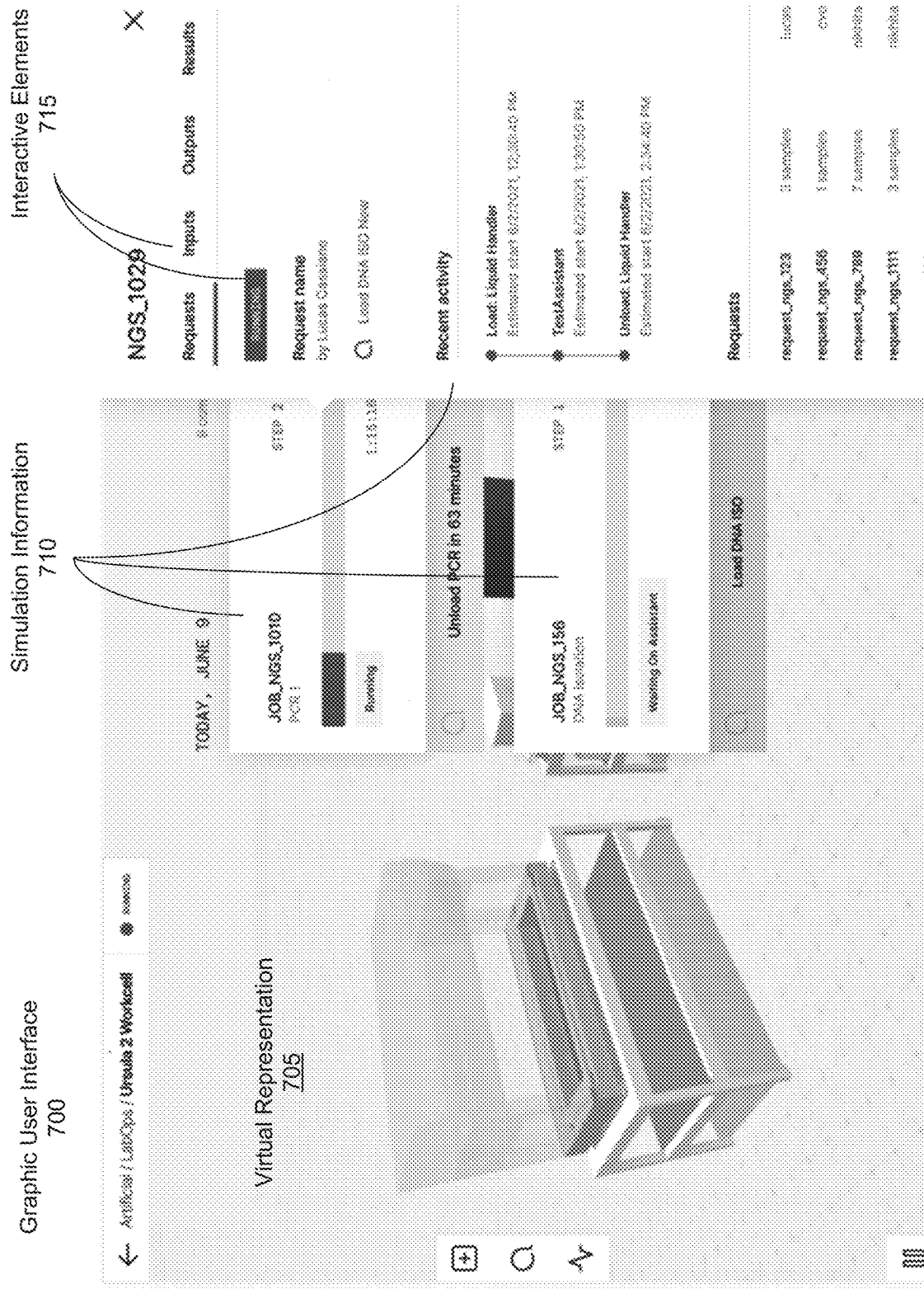
FIG. 7 illustrates an example user interface depicting a simulation, according to one embodiment.

FIG. 7 illustrates an example graphic user interface 700 depicting a simulation, according to one embodiment. A user may request a simulation of a protocol in a lab 140 via interactive elements 715 of the graphic user interface 700. The graphic user interface module 355 receives virtual representations 705 from the simulation module 340 for each step of a protocol and modifies the graphic user interface 700 to display the virtual representations for each step in the order dictated by the protocol. The graphic user interface 700 may additionally show simulation information about the simulation, such as statistics representing the likelihood of success of the protocol being performed in the lab 140, a time to competition, a time the simulation has been running, which step the simulation is currently running, which steps have already been run for the simulation, and any other suitable information about the simulation.

Processes

Figure 8:
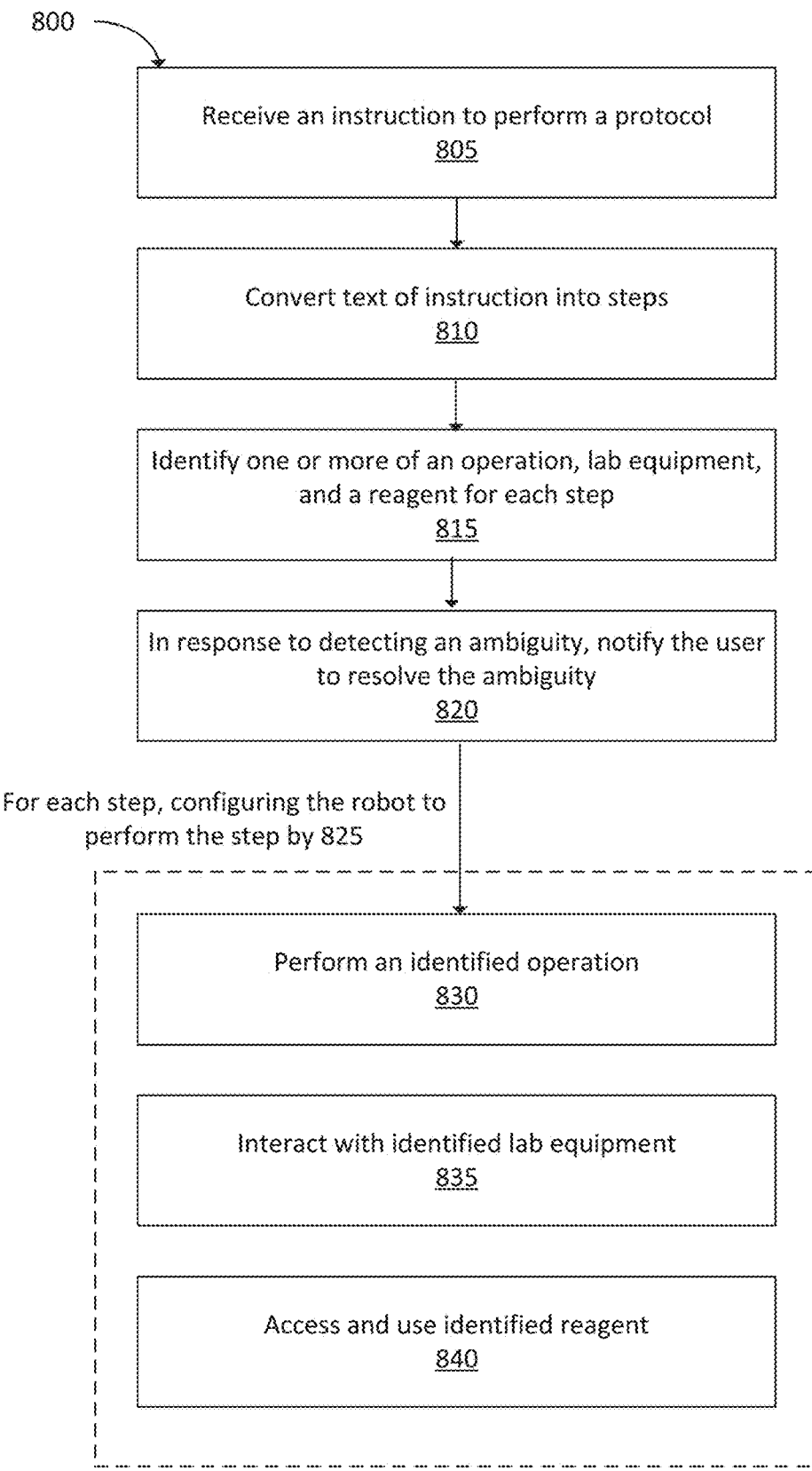
FIG. 8 illustrates a process for configuring a robot to perform steps for a protocol, according to one embodiment.

FIG. 8 illustrates a process 800 for configuring a robot 150 to perform steps for a protocol, according to one embodiment. In particular, the graphic user interface module 355 receives 805, via a graphic user interface, an instruction from a user to perform a protocol within a lab 140. The instruction may comprise text indicating the instructions and the lab 140 to perform the protocol associated with the instructions in. The graphic user interface module 355 sends the instructions to the instruction module 310, which converts 810, using a machine learned model 370, the text into steps. Each step may be a segment of the text indicating an action to be performed for the protocol. In some embodiments, the machine learned model 370 may use natural language processing to extract generic capabilities (e.g., actions) from the text.

For each step, the instruction module 310 identifies 815 one or more of an operation such as the action), lab equipment 170, and reagent 180 associated with the step. For instance, the instruction module 310 may access the lab database 380 to determine which components are available in the lab 140 and select only available lab equipment 170 and reagents 180 for the step. In response to detecting an ambiguity or error associated with the step, the instruction module 310 alerts the graphic user interface module 355, and the graphic user interface module 355 notifies 820 the user via the graphic user interface of the ambiguity or error. For each step, the protocol module 330 configures 825 a robot 150 to perform 830 an identified operation, interact 835 with identified lab equipment 170, and/or access and use 840 an identified reagent 180 associated with the step.

It is appreciated that although FIG. 8 illustrates a number of interactions according to one embodiment, the precise interactions and/or order of interactions may vary in different embodiments. For example, in some embodiments, the instruction module 310 may determine a det of candidate actions for the ambiguity or error and select a candidate action with more than a threshold likelihood of resolving the ambiguity or error. The instruction module 310 may send the candidate operation to the graphic user interface module 355, which displays an indication of the step associated with the ambiguity or error via the graphic user interface. The graphic user interface module 355 may also display, in a virtual representation of the lab 140, a representative action associated with the candidate operation, such that the user can see what the candidate operation would look like being performed in the lab 140. In other embodiments, the instruction module 310 may determine a list of one or more candidate operations, lab equipment 170, and/or reagents 180 that may resolve the ambiguity or error, and the graphic user interface module 355 may display the list via the graphic user interface.

Figure 9:
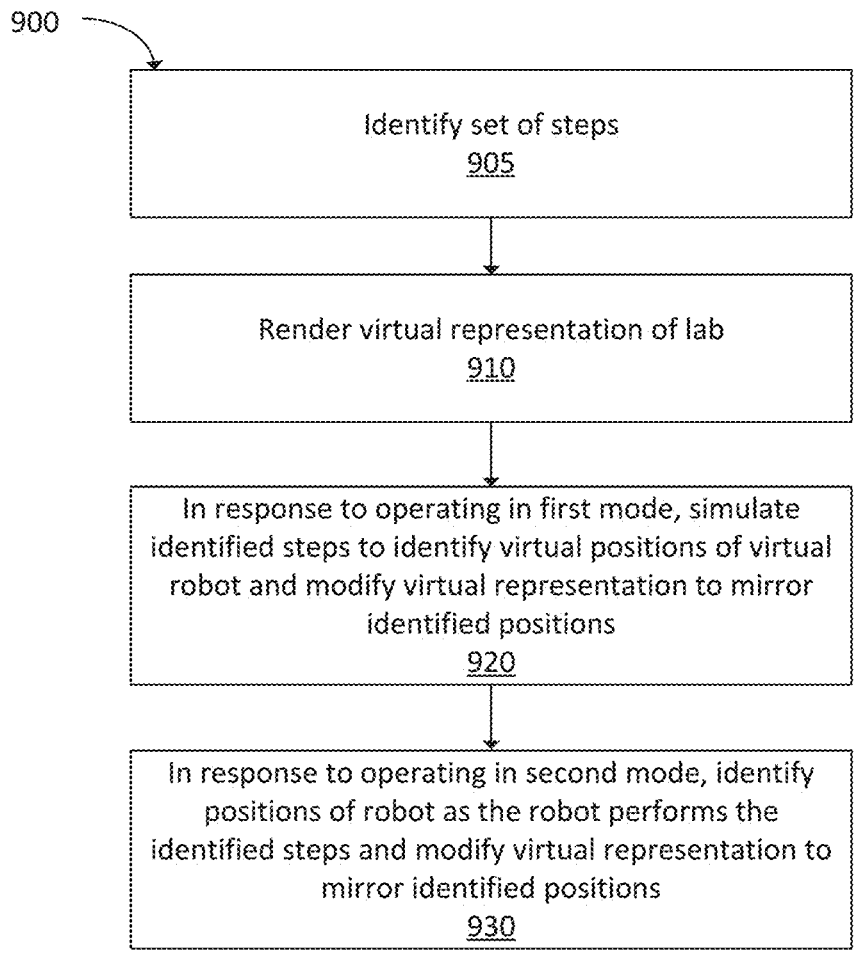
FIG. 9 illustrates a process for simulating a protocol in a virtual representation of a lab, according to one embodiment.

FIG. 9 illustrates a process 900 for simulating a protocol in a virtual representation of a lab 140, according to one embodiment. The simulation module 340 identifies 905 a set of steps associated with a protocol for a lab 140. Each step may be meant to be performed by a robot 150 within the lab 140 using one or more of lab equipment 170 and reagents 180. The rendering module 320 renders 910 a virtual representation of the lab 140, a virtual robot within the lab 140, and virtual equipment and reagents 180 within the lab 140, and the graphic user interface module 355 may present the virtual representation in a graphic user interface. The rendering module 320 stores the virtual representation of the lab 140 in the representation database 360 such that the simulation module 340 may access the virtual representation of the lab 140 to run simulations.

In response to operating in a first mode, the simulation module 340 simulates 920 the identified set of steps being performed by the virtual robot to identify virtual positions of the virtual robot within the lab 140 as the virtual robot performs the identified set of steps and modifies the virtual representation of the lab 140 to mirror the identified positions of the virtual robot as the virtual robot performs the identified set of steps. The graphic user interface module 355 may present, via the graphic user interface, the modified virtual representation for each step. In response to operating in a second mode, the simulation module 340 identifies 930 positions of the robot 150 within the lab 140 as the robot 150 performs the identified set of steps and modifies the virtual representation of the lab 140 to mirror the identified positions of the robot 150 as the robot 150 performs the identified set of steps. The graphic user interface module 355 may present, via the graphic user interface, the modified virtual representation for each step as the step is performed in real-time in the lab 140.

It is appreciated that although FIG. 9 illustrates a number of interactions according to one embodiment, the precise interactions and/or order of interactions may vary in different embodiments. For example, in some embodiments, the instruction module 310 may determine one or more alternate robots 150 for the robot 150 of the protocol, where each of the alternate robots 150 has capabilities that map to capabilities of the robot 150 (e.g., the alternate robots 150 have the ability to perform the same operations as the robot 150). The simulation module 340 may simulate the identified set of steps being performed by one or more of the alternate robots 150 and the graphic user interface module 355 may present the simulated steps in the virtual representation of the lab 140 to the user, such that the user may view how the protocol would be performed using the one or more alternate robots 150.

In some embodiments, the instruction module 310 may determine a set of variants for one or more of the robot 150, lab 140, lab equipment 170, and reagents 180. The set of variants may include at least two subsets of variants, and the first subset may include variants with the same functionality as the identified set of steps, robot 150, lab 140, lab equipment 170, and reagents 180. For instance, the instruction module 310 may determine that the lab equipment 170 "Liquefier 25 ml pipettes" may be replaced by "Science & Co. 25 ml pipettes." The second subset may include variants with alternate functionality to the identified set of steps, robot 150, lab 140, lab equipment 170, and reagents 180 that still accomplishes the same result as the identified set of steps, robot 150, lab 140, lab equipment 170, and reagents 180. For example, a first lab 140 may usually be used to perform research in, and a second lab may usually be used to synthesize carbon nanotubes. The instruction module 310 may determine that the labs include enough equipment 170 overlap that the labs 140 are variants of one another. The simulation module 340 may simulate protocols using each of the subset of variants and modify the virtual representation of the lab 140 for the simulation in different colors for each subset (e.g., the first subset may be shown in blue and the second subset may be shown in green). Further, if the instruction module 310 determines that no variants exist for the identified set of steps, robot 150, lab 140, lab equipment 170, and reagents 180, the instruction module 310 sends an indication to the graphic user interface module 355 to notify a user that no variants exist.

In some embodiments, the instruction module 310 may determine multiple sets of variants for a protocol. For instance, a user may request, via the graphic user interface, to see simulations of a protocol being performed partially manually and fully automated. The instruction module 310 may select two sets of variants for the protocol. The first set may include a mix of variants related to both automatic and manual operations of the protocol, and the second set may only include variants related to automatic operations of the protocol. The instruction module sends the sets of variants for the protocol to the simulation module 340, which simulates the protocol being performed with each set of variants. The graphic user interface module 355 may display the simulations via the graphic user interface such that a user can see the differences between performing the protocol semi manually and fully automatically.

Figure 10:
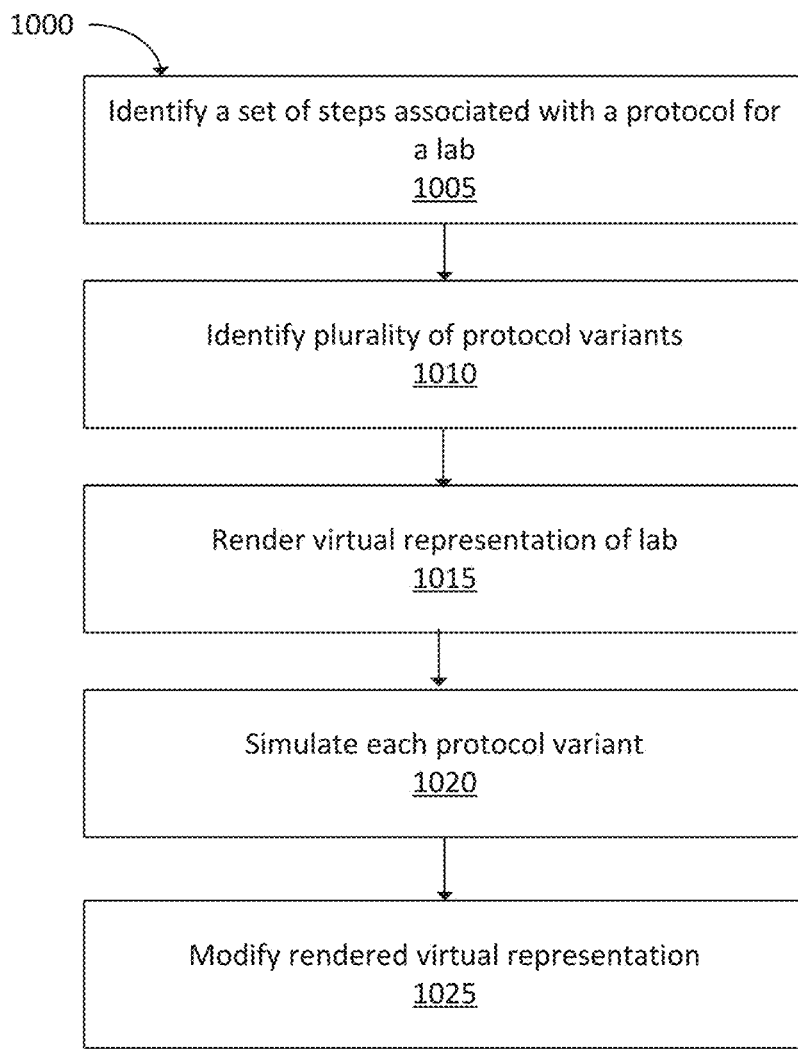
FIG. 10 illustrates a process for modifying a virtual representation, according to one embodiment.

FIG. 10 illustrates a process 1000 for modifying a virtual representation, according to one embodiment. The instruction module 310 identifies 1005 a set of steps associated with a protocol for a lab 140, each step being associated with lab equipment 170 and reagents 180. The instruction module 310 identifies 1010 a plurality of protocol variants. Each of the protocol variants is associated with a first subset of steps performed by a robot 150 and a second subset of steps performed by a human operator. The rendering module 320 renders 1015 a virtual representation of the lab 140, which the graphic user interface module 355 may display via a graphic user interface. The simulation module 340 simulates 1020 each protocol variant by modifying the virtual representation to show the first subset of steps being performed by a virtual robot and the second subset of steps being performed by a virtual human operator. The simulation module 340 modifies 1025 the virtual representation to include characteristics of each protocol variant. The characteristics may include one or more of an amount of time each simulated protocol variant requires, a resource requirement of the simulated protocol variant, and a measure of automation of the simulated protocol variant.

It is appreciated that although FIG. 10 illustrates a number of interactions according to one embodiment, the precise interactions and/or order of interactions may vary in different embodiments. For example, in some embodiments, the characteristics may further include statistics describing expected delays from human operators performing the second subset of steps in the lab 140 and potential scheduling conflicts with the components of the lab 140.

Figure 11:
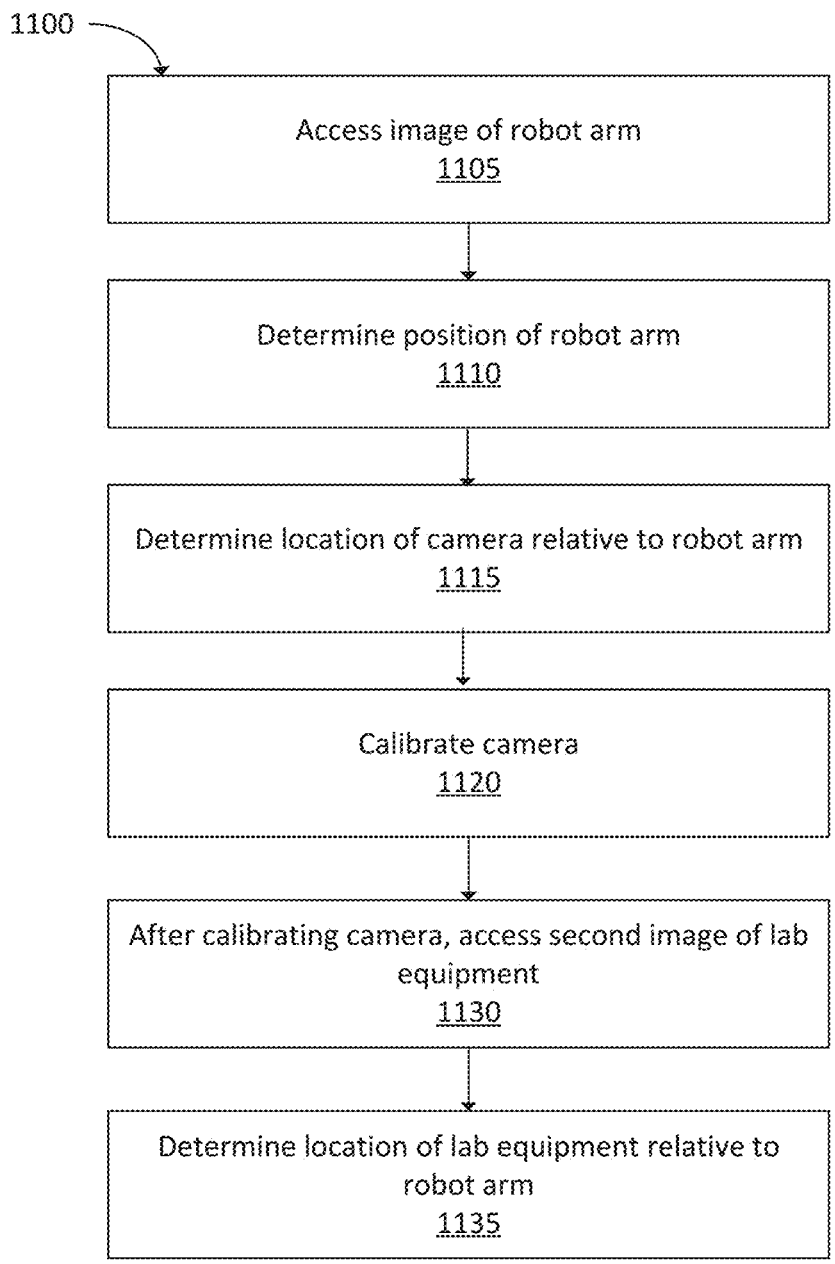
FIG. 11 illustrates a process for determining a location of lab equipment relative to a robot arm, according to one embodiment.

FIG. 11 illustrates a process 1100 for determining a location of lab equipment 170 relative to a robot arm 225, according to one embodiment. The calibration module 350 accesses 1105, via a camera within a lab 140, a first image of a robot arm 225 (or another component of a robot 150 or lab equipment 170 in the lab 140). The robot arm 225 (or other component) comprises a visible tag located on an exterior. The calibration module 350 determines 1110 a position of the robot arm 225 using one or more position sensors located within the arm and determines 1115 a location of the camera relative to the robot arm based on the determined position and the location of the visible tag in the first image (e.g., by triangulating). The calibration module 350 calibrates 1120 the camera using the determined location of the camera relative to the robot arm 225. After calibrating the camera, the calibration module 350 accesses 1130, via the camera, a second image of equipment 170 (or, in some embodiments, another robot 150) that comprises a second visible tag on an exterior. The calibration module 350 determines 1135, based on a location of the second visible tag within the accessed second image, a location of the equipment 170 relative to the robot arm 225.

It is appreciated that although FIG. 11 illustrates a number of interactions according to one embodiment, the precise interactions and/or order of interactions may vary in different embodiments. For example, in some embodiments, the calibration module 340 may access, via the camera, a third image of the robot arm 225, where the robot arm 225 is in a different position than in the first image. The calibration module may determine that recalibration of the camera is necessary based on the third image and corresponding position data of the robot arm 225. The calibration module 350 determines a second location of the camera relative to the robot arm 225 based on a second determined position of the robot arm 225 in the third image and a second location of the tag within the third image. The calibration module 350 calibrates the camera using the second location of the camera.

Figure 12:
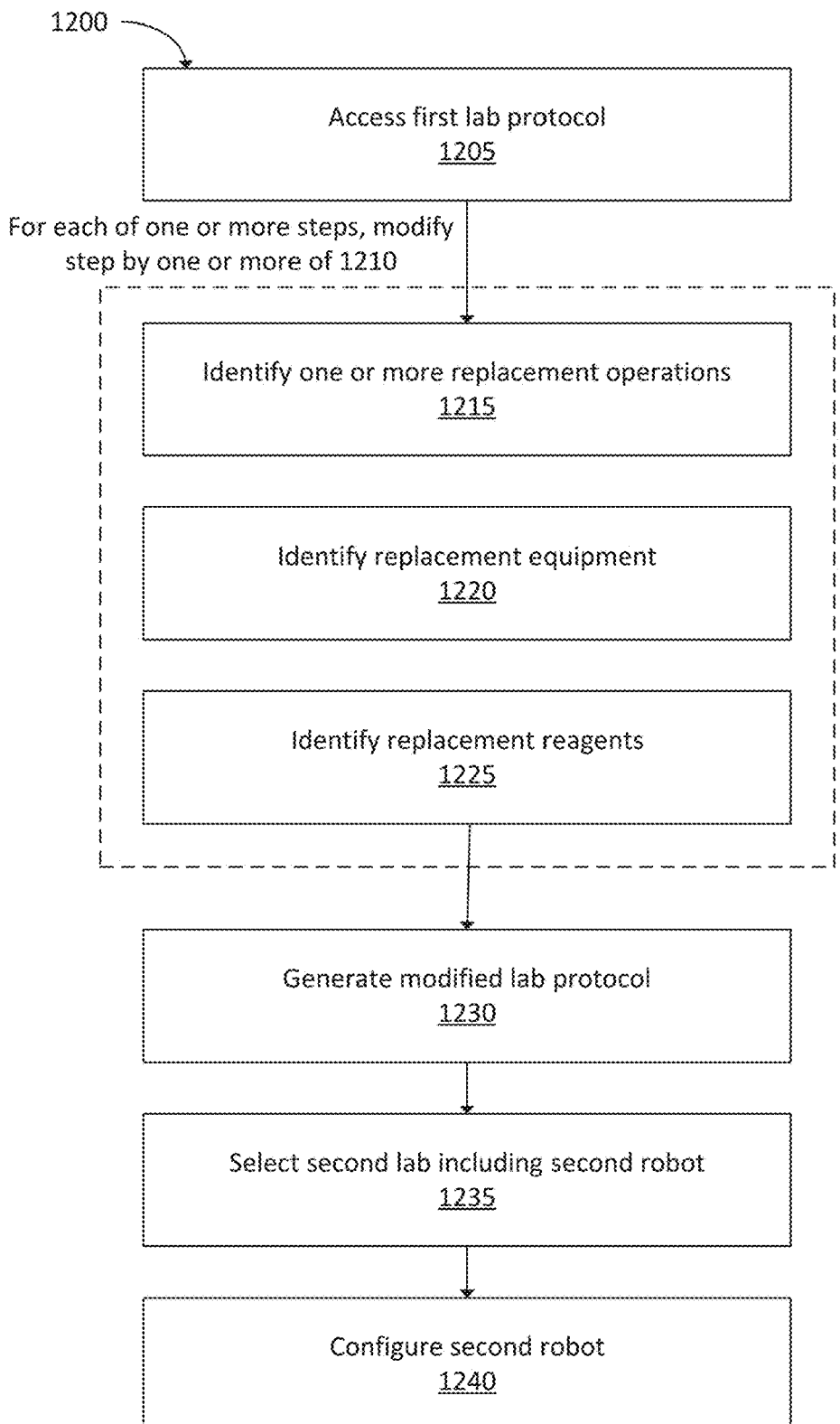
FIG. 12 illustrates a process for configuring a second robot, according to one embodiment.

FIG. 12 illustrates a process 1200 for configuring a second robot 150, according to one embodiment. The protocol module 330 accesses 1205, from the protocol database 390, a first protocol to be performed by a first robot 150 in a first lab 140. The first protocol includes a set of steps, each associated with one or more of an operation, equipment 170, and a reagent 180 in the first lab 140. For each of one or more of the set of steps, the protocol module 330 modifies 1210 the step by one or more of: (1) identifying 1215 one or more replacement operations (e.g., variants) that, when performed, achieve an equivalent or substantially similar result as a performance of the operation associated with the step, (2) identifying 1220 replacement equipment 170 (e.g., variants) that operate substantially similarly to the equipment 170 associated with the step, and (3) identifying 1225 one or more replacement reagents 180 (e.g., variants) that, when substituted for the reagent 180 associated with the step, do not substantially affect the performance of the step. In some embodiments, the graphic user interface module 355 may receive a selection of a virtual element representing equipment 170 in the lab 140 and send an indication to the protocol module 330 to use the equipment 170 in the modified protocol.

The protocol module 330 generates 1230 a modified protocol by replacing one or more of the set of steps from the first protocol with the one or more modified steps. The protocol module 330 may request a set of candidate labs from the instruction module 310, which determines the set of candidate labs for the modified lab protocol. Each of the candidate labs 140 includes the identified replacement equipment 170 and replacement reagents 180. The instruction module 310 selects 1235, from a set of candidate labs 140, a second lab 140 including a second robot 150 that can perform the modified protocol. In some embodiments, the instruction module 310 may send the set of candidate labs to the graphic user interface module 355 for display to a user in a selectable list and receives a selection of a candidate lab to use as the second lab. The instruction module 310 sends the selection to the protocol module 330, which modifies the protocol to include the second lab 140. The protocol module 330 configures 1240 the second robot 150 to perform the modified protocol in the second lab 140.

It is appreciated that although FIG. 12 illustrates a number of interactions according to one embodiment, the precise interactions and/or order of interactions may vary in different embodiments. For example, in some embodiments, the instruction module 310 may request, from the simulation module 340, an experimentation time for performing the modified lab protocol in each of the set of candidate labs 140. The simulation module 340 may run a simulation of the modified lab protocol to determine the experimentation time for each candidate lab 140 based on the equipment 170 and reagents 180 available in the candidate lab 140 and the schedule of the candidate lab 140. The instruction module 310 may select the second lab from the candidate labs based on the determined experimentation times received from the simulation module 340.

Figure 13:
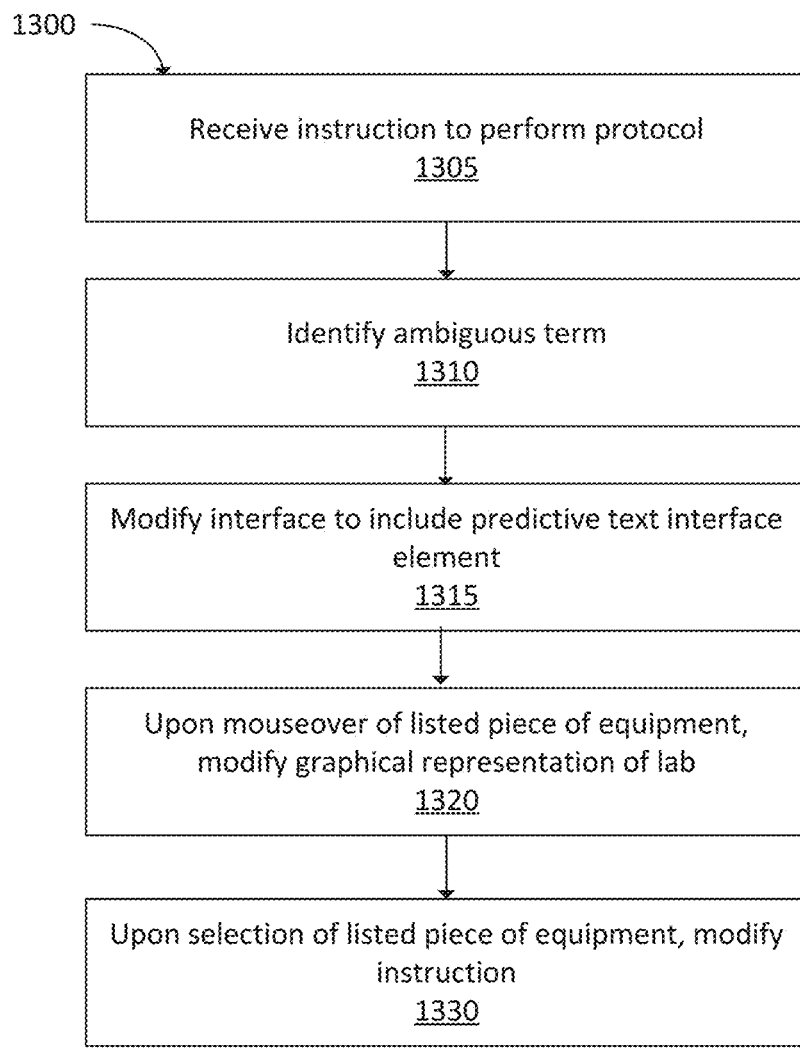
FIG. 13 illustrates a process for modifying an instruction upon selection of a piece of equipment, according to one embodiment.

FIG. 13 illustrates a process 1300 for modifying an instruction upon selection of a piece of equipment 170, according to one embodiment. The instruction module 310 receives 1305, from the graphic user interface module 355, an instruction to perform a protocol within a lab 140. The instruction may be entered by a user via a graphic user interface including a virtual representation of the lab 140. The lab 140 includes a robot 150 and set of equipment 170 rendered within the virtual representation of the lab 140. The instruction module 310 identifies 1310 an ambiguous term of the instruction and one or more pieces of equipment 170 corresponding to the ambiguous term and modifies the interface to include a predictive text interface element listing the one or more pieces of equipment 170 corresponding to the ambiguous term. Upon a mouseover of a listed piece of equipment 170 within the predictive text interface element, the graphic user interface module 355 modifies 1320 the virtual representation of the lab 140 to highlight the listed piece of equipment 170 corresponding to the mouseover. In some embodiments, the graphic user interface module 355 may further modify the virtual representation to depict a virtual element representing the listed piece of equipment performing an operation within the lab 140. Upon a selection of the listed piece of equipment 170 within the predictive text interface element, the graphic user interface module 355 modifies 1330 the instruction to include the listed piece of equipment 170.

It is appreciated that although FIG. 13 illustrates a number of interactions according to one embodiment, the precise interactions and/or order of interactions may vary in different embodiments. For example, in some embodiments, the graphic user interface module 355 may receive text representative of a name of the listed piece of equipment 150 along with the selection of the listed piece of equipment 150. The graphic user interface module 355 may update the virtual representation to include the text for the piece of equipment in the representation database 360 or update the name of the piece of equipment 150 to match the text in the lab database 380.

In some embodiments, the graphic user interface module 355 may additionally display, via the graphic user interface, a list of projections for performing the protocol using the listed piece of equipment 150. Each projection comprises a list of manual and automatic steps required for the protocol and may be associated with a time frame indicating an amount of time required to perform the protocol using the steps from the projection. Upon selection of a projection, the graphic user interface module 355 requests a simulation of the protocol being performed using the operation of the projection in the lab from the simulation module 340 and displays the simulation according to the projection at the graphic user interface. The graphic user interface module 355 may additionally display one or more alerts indicating potential errors that may occur when the protocol is performed according to the projection.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a lab automation system, an instruction from a user to perform a protocol within a lab via an interface including a graphical representation of the lab, the lab including a robot and set of lab equipment 3-D rendered within the graphical representation of the lab;
identifying, by the lab automation system, that a portion of text of the received instruction is an ambiguous term by determining that the portion of the text is mapped to a piece of physical equipment that is not included within the lab;
responsive to identifying the ambiguous term, cross-referencing a database of physical equipment within the lab with the portion of text to identify one or more variant pieces of equipment that correspond to the ambiguous term, wherein the variant pieces of equipment perform a same or similar functionality to the piece of physical equipment;
modifying, by the lab automation system, the interface to include a predictive text interface element listing the one or more variant pieces of equipment corresponding to the ambiguous term;
upon a mouseover of a listed variant piece of equipment within the predictive text interface element, modifying, by the lab automation system, the graphical representation of the lab to highlight the 3-D rendered variant piece of equipment corresponding to the mouseover at a location within the graphical representation of the lab corresponding to a real-world location of the listed variant piece of equipment within the lab; and
upon a selection of the listed variant piece of equipment within the predictive text interface element, modifying, by the lab automation system, the instruction to include the listed variant piece of equipment.

2. The method of claim 1, further comprising:
receiving, with the selection of the listed variant piece of equipment, text representative of a name of the listed variant piece of equipment; and
updating a lab database to label the listed variant piece of equipment with the text.

3. The method of claim 1, wherein modifying the graphical representation of the lab to highlight the listed variant piece of equipment corresponding to the mouseover further comprises:
modifying, by the lab automation system, the graphical representation of the lab to depict the listed variant piece of equipment performing an operation in the lab.

4. The method of claim 1, further comprising:
displaying, via the interface, a list of projections for performing the protocol using the selected listed variant piece of equipment;
upon selection of a projection of the list, displaying, via the graphical representation of the lab, a simulation of the listed variant piece of equipment performing the protocol according to the projection.

5. The method of claim 4, wherein the projections in the list comprise a combination of automatic and manual steps for the protocol.

6. The method of claim 4, wherein each projection is associated with a time frame of an amount of time required to perform the protocol according to the projection.

7. The method of claim 4, further comprising:
displaying, via the interface, one or more alerts indicating potential errors that may occur when the protocol is performed according to the projection.

8. A non-transitory computer-readable storage medium with instructions executable by a processor comprising:
instructions for receiving, by a lab automation system, an instruction from a user to perform a protocol within a lab via an interface including a graphical representation of the lab, the lab including a robot and set of lab equipment 3-D rendered within the graphical representation of the lab;
instructions for identifying, by the lab automation system, that a portion of text of the received instruction is an ambiguous term by determining that the portion of the text is mapped to a piece of physical equipment that is not included within the lab;

instructions for responsive to identifying the ambiguous term, cross-referencing a database of physical equipment within the lab with the portion of text to identify one or more variant pieces of equipment that correspond to the ambiguous term, wherein the variant pieces of equipment perform a same or similar functionality to the piece of physical equipment;

instructions for modifying, by the lab automation system, the interface to include a predictive text interface element listing the one or more variant pieces of equipment corresponding to the ambiguous term;

instructions for, upon a mouseover of a listed variant piece of equipment within the predictive text interface element, modifying, by the lab automation system, the graphical representation of the lab to highlight the 3-D rendered variant piece of equipment corresponding to the mouseover at a location within the graphical representation of the lab corresponding to a real-world location of the listed variant piece of equipment within the lab; and instructions for, upon a selection of the listed variant piece of equipment within the predictive text interface element, modifying, by the lab automation system, the instruction to include the listed variant piece of equipment.

9. The non-transitory computer-readable storage medium of claim 8, the instructions further comprising:

receiving, with the selection of the listed variant piece of equipment, text representative of a name of the listed variant piece of equipment; and updating a lab database to label the listed variant piece of equipment with the text.

10. The non-transitory computer-readable storage medium of claim 8, wherein the instructions for modifying the graphical representation of the lab to highlight the listed variant piece of equipment corresponding to the mouseover further comprise:

instructions for modifying, by the lab automation system, the graphical representation of the lab to depict the listed variant piece of equipment performing an operation in the lab.

11. The non-transitory computer-readable storage medium of claim 8, wherein the instructions further comprise:

instructions for displaying, via the interface, a list of projections for performing the protocol using the selected listed variant piece of equipment;

instructions for, upon selection of a projection of the list, displaying, via the graphical representation of the lab, a simulation of the listed variant piece of equipment performing the protocol according to the projection.

12. The non-transitory computer-readable storage medium of claim 11, wherein the projections in the list comprise a combination of automatic and manual steps for the protocol.

13. The non-transitory computer-readable storage medium of claim 11, wherein each projection is associated with a time frame of an amount of time required to perform the protocol according to the projection.

14. The non-transitory computer-readable storage medium of claim 11, wherein the instructions further comprise:

instructions for displaying, via the interface, one or more alerts indicating potential errors that may occur when the protocol is performed according to the projection.

15. A computer system comprising:

a processor; and a non-transitory computer-readable storage medium storing instructions that, when executed, cause the processor to:

receive, by a lab automation system, an instruction from a user to perform a protocol within a lab via an interface including a graphical representation of the lab, the lab including a robot and set of lab equipment 3-D rendered within the graphical representation of the lab;

identify, by the lab automation system, that a portion of text of the received instruction is an ambiguous term by determining that the portion of the text is mapped to a piece of physical equipment that is not included within the lab;

responsive to identifying the ambiguous term, cross-reference a database of physical equipment within the lab with the portion of text to identify one or more variant pieces of equipment that correspond to the ambiguous term, wherein the variant pieces of equipment perform a same or similar functionality to the piece of physical equipment;

modify, by the lab automation system, the interface to include a predictive text interface element listing the one or more variant pieces of equipment corresponding to the ambiguous term;

upon a mouseover of a listed variant piece of equipment within the predictive text interface element, modify, by the lab automation system, the graphical representation of the lab to highlight the 3-D rendered variant piece of equipment corresponding to the mouseover at a location within the graphical representation of the lab corresponding to a real-world location of the listed variant piece of equipment within the lab; and upon a selection of the listed variant piece of equipment within the predictive text interface element, modify, by the lab automation system, the instruction to include the listed variant piece of equipment.

16. The computer system of claim 15, the instructions further causing the processor to:

receive, with the selection of the listed variant piece of equipment, text representative of a name of the listed variant piece of equipment; and update a lab database to label the listed variant piece of equipment with the text.

17. The computer system of claim 15, wherein modifying the graphical representation of the lab to highlight the listed variant piece of equipment corresponding to the mouseover further comprises:

modify, by the lab automation system, the graphical representation of the lab to depict the listed variant piece of equipment performing an operation in the lab.

18. The computer system of claim 15, the instructions further causing the processor to:

display, via the interface, a list of projections for performing the protocol using the selected listed variant piece of equipment;

upon selection of a projection of the list, display, via the graphical representation of the lab, a simulation of the listed variant piece of equipment performing the protocol according to the projection.

19. The computer system of claim 18, wherein the projections in the list comprise a combination of automatic and manual steps for the protocol.

20. The computer system of claim 18, wherein each projection is associated with a time frame of an amount of time required to perform the protocol according to the projection.

\* \* \* \* \*